United States Patent
Kim et al.

(10) Patent No.: US 10,000,002 B2
(45) Date of Patent: Jun. 19, 2018

(54) METHOD FOR MANUFACTURING POLYMER FILM AND CO-EXTRUDED FILM

(71) Applicant: KOLON INDUSTRIES, INC., Gwacheon-si (KR)

(72) Inventors: Yun-Jo Kim, Yongin-si (KR); Si-Min Kim, Yongin-si (KR); Dong-Hyeon Choi, Yongin-si (KR); Dong-Jin Kim, Yongin-si (KR)

(73) Assignee: KOLON INDUSTRIES, INC., Gwacheon-si (KR)

(*) Notice: Subject to any disclaimer, the term of this patent is extended or adjusted under 35 U.S.C. 154(b) by 46 days.

(21) Appl. No.: 15/107,519

(22) PCT Filed: Dec. 30, 2014

(86) PCT No.: PCT/KR2014/013055
§ 371 (c)(1),
(2) Date: Jun. 23, 2016

(87) PCT Pub. No.: WO2015/102378
PCT Pub. Date: Jul. 9, 2015

(65) Prior Publication Data
US 2016/0318227 A1    Nov. 3, 2016

(30) Foreign Application Priority Data

Dec. 31, 2013 (KR) .................. 10-2013-0169222
Dec. 31, 2013 (KR) .................. 10-2013-0169223

(51) Int. Cl.
*B32B 7/00* (2006.01)
*B29C 47/70* (2006.01)
(Continued)

(52) U.S. Cl.
CPC ........ *B29C 47/707* (2013.01); *B29C 47/0004* (2013.01); *B29C 47/0021* (2013.01);
(Continued)

(58) Field of Classification Search
CPC ............ B29C 47/0004; B29C 47/0019; B29C 47/0021; B29C 47/065; B29C 47/707;
(Continued)

(56) References Cited

U.S. PATENT DOCUMENTS 4,617,207 A * 10/1986 Ueki .................. B29C 47/06
264/176.1
5,094,793 A    3/1992 Schrenk
(Continued)

FOREIGN PATENT DOCUMENTS

DE    202012102061    8/2012
JP    2012-116392    6/2012
(Continued)

OTHER PUBLICATIONS

PCT Search Report & Written Opinion, Patent Cooperation Treaty, dated Apr. 29, 2015, Application No. PCT/KR2014/013055.
(Continued)

*Primary Examiner* — Lawrence Ferguson
(74) *Attorney, Agent, or Firm* — Lex IP Meister, PLLC

(57) ABSTRACT

The present invention relates to: a method for manufacturing a polymer film, the method including a base film forming step for co-extruding a first resin containing a polyamide-based resin and a second resin containing a copolymer including polyamide-based segments and polyether-based segments; a co-extruded film including a base film including a first resin layer containing a polyamide-based resin, and a second resin layer containing a copolymer having polyamide-based segments and polyether-based segments; to a co-extruded film including a base film including a first resin layer and a second resin layer, which have different melting points; and to a method for manufacturing a polymer film, the method including a base film forming step including a
(Continued)

step of co-extruding a first resin and a second resin, which have different melting points.

9 Claims, 3 Drawing Sheets

(51) Int. Cl.
| | |
|---|---|
| B32B 27/08 | (2006.01) |
| B32B 27/18 | (2006.01) |
| B60C 5/14 | (2006.01) |
| B32B 7/02 | (2006.01) |
| B32B 27/00 | (2006.01) |
| B32B 27/28 | (2006.01) |
| B32B 27/34 | (2006.01) |
| B32B 1/00 | (2006.01) |
| B32B 3/00 | (2006.01) |
| B29C 47/06 | (2006.01) |
| B29D 30/06 | (2006.01) |
| B29C 47/00 | (2006.01) |
| B29K 21/00 | (2006.01) |
| B29K 71/00 | (2006.01) |
| B29K 77/00 | (2006.01) |
| B29L 30/00 | (2006.01) |

(52) U.S. Cl.
CPC ........ *B29C 47/065* (2013.01); *B29D 30/0681* (2013.01); *B32B 1/00* (2013.01); *B32B 3/00* (2013.01); *B32B 7/00* (2013.01); *B32B 7/02* (2013.01); *B32B 27/00* (2013.01); *B32B 27/08* (2013.01); *B32B 27/18* (2013.01); *B32B 27/28* (2013.01); *B32B 27/285* (2013.01); *B32B 27/286* (2013.01); *B32B 27/34* (2013.01); *B60C 5/14* (2013.01); *B29C 47/0019* (2013.01); *B29D 2030/0682* (2013.01); *B29K 2021/00* (2013.01); *B29K 2071/00* (2013.01); *B29K 2077/00* (2013.01); *B29L 2030/008* (2013.01); *B32B 2250/00* (2013.01); *B32B 2250/24* (2013.01); *B32B 2250/40* (2013.01); *B32B 2274/00* (2013.01); *B32B 2307/552* (2013.01); *B32B 2307/554* (2013.01); *B32B 2307/718* (2013.01); *B32B 2307/7242* (2013.01); *B32B 2307/734* (2013.01); *B32B 2605/00* (2013.01); *B32B 2605/08* (2013.01); *B60C 2005/145* (2013.01)

(58) Field of Classification Search
CPC ........ B29D 2030/0682; B29D 30/0681; B32B 1/00; B32B 2250/00; B32B 2250/24; B32B 2605/00; B32B 27/00; B32B 27/08; B32B 27/18; B32B 27/28; B32B 27/285; B32B 27/286; B32B 27/34; B32B 3/00; B32B 7/00; B32B 7/02
See application file for complete search history.

(56) References Cited

U.S. PATENT DOCUMENTS

| 8,124,241 | B2 | 2/2012 | Yanagida |
| 2009/0308517 | A1 | 12/2009 | Nohara |
| 2013/0192735 | A1 | 8/2013 | Jeong |
| 2013/0199686 | A1 | 8/2013 | Chung, II et al. |
| 2014/0261976 | A1 | 9/2014 | Imoto |

FOREIGN PATENT DOCUMENTS

| KR | 10-2008-0113392 | 12/2008 |
| KR | 10-2009-0047482 | 5/2009 |
| KR | 10-2013-0035856 | 4/2013 |
| KR | 10-2013-0035975 | 4/2013 |
| WO | 2013-051325 | 4/2013 |

OTHER PUBLICATIONS

EPO, Extended European Search Report of EP 14877326.0 dated Jul. 4, 2017.

\* cited by examiner

[Fig. 1]
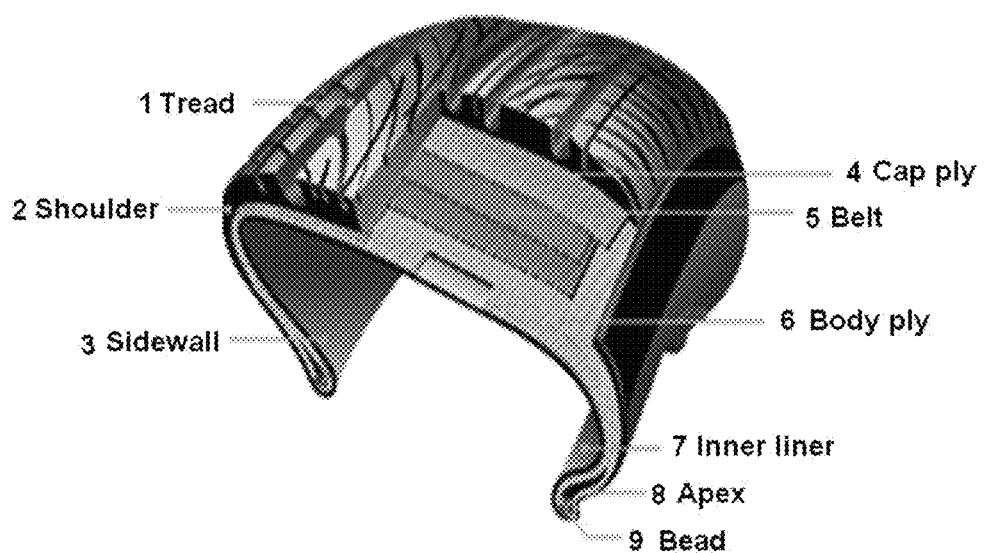

[Fig. 2]
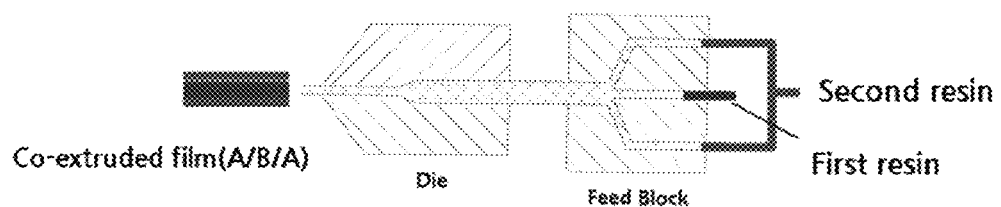

[Fig. 3]
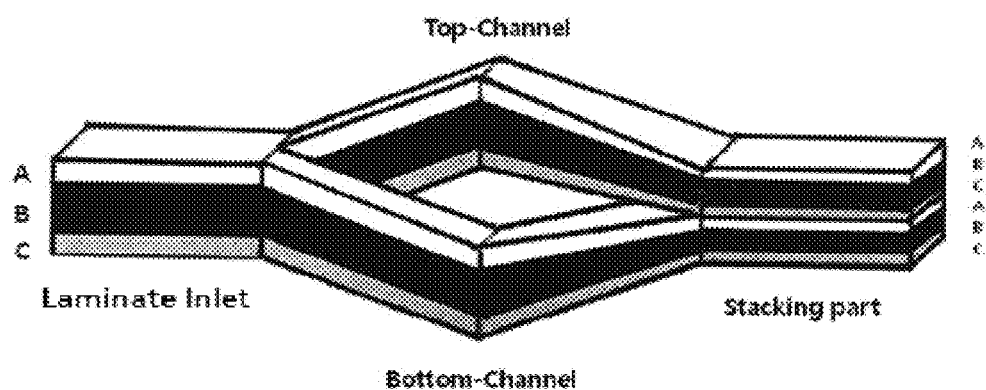

METHOD FOR MANUFACTURING POLYMER FILM AND CO-EXTRUDED FILM

TECHNICAL FIELD

A method for manufacturing a polymer film and a co-extruded film are provided. More particularly, a method for manufacturing a polymer film which can be used for an inner liner of tires, endow an excellent gas barrier property even to tires having a thin thickness, thereby reducing weight of tires and improving fuel efficiency of automobiles, and ensure high elasticity together with excellent durability and fatigue resistance in a tire manufacturing process or in an automobile running process, and a co-extruded film for an inner liner which can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process, are provided.

BACKGROUND ART

A tire serves to withstand the load of an automobile, to reduce impact with a road surface, and to transfer driving force or braking force of an automobile to the ground.

In general, the tire refers to a complex of fiber/steel/rubber, and normally has a structure as shown in FIG. 1.

Tread (1): a portion that is in contact with the road surface. It should afford frictional force required for driving and braking, have good wear resistance, withstand external impact, and have minimal heat generation.

Body ply (or carcass) (6): a cord layer inside the tire. It should support a load, withstand impact, and have strong fatigue resistance to bending and stretching while the vehicle is running.

Belt (5): located between the body plies. It consists of steel wire in most cases, reduces external impact, and maintains a large area of contact of the ground to the surface of the tread to afford excellent vehicle running stability.

Side wall (3): a rubber layer between a part below a shoulder (2) and a bead (9). It serves to protect the inner body ply (6).

Inner liner (7): located inside the tire instead of a tube. It prevents air leakage to enable a pneumatic tire.

Bead 9: square or hexagonal wire bundle formed of rubber-coated steel wire. It serves to stabilize and fix the tire in a rim.

Cap ply (4): a special cord located on a belt of a radial tire for some passenger cars. It minimizes movement of the belt during automobile running.

Apex (8): triangular rubber filler used to minimize dispersion of the bead, reduce external impact to protect the bead, and prevent air inflow during molding.

Recently, a tubeless tire (or pneumatic tire) in which high pressure air of about 30~40 psi is injected without using a tube has become typically used. In order to prevent inside air from leaking outside during automobile running, an inner liner having a high gas barrier property is disposed in an inner layer of the carcass.

Previously, a tire inner liner consisting mainly of rubber components such as butyl rubber or halobutyl rubber having relatively low air permeability was used, but in order to achieve a sufficient gas barrier property of the inner liner, the content of the rubber components and the thickness of the inner liner should be increased.

However, if the content of the rubber components and the thickness of the tire are increased, there were problems in that the total weight of the tire is increased and the fuel efficiency of automobiles is lowered.

Moreover, since the rubber components have relatively low heat resistance, there were problems in that air pockets may be generated between rubber in the inner surface of a carcass layer and an inner liner, or the shape or physical properties of the inner liner may be changed in a vulcanization process of tires or in an automobile running process during which repeated deformations occur under a high temperature condition.

In addition, in order to adhere the rubber components to a carcass layer of a tire, a vulcanizing agent should be used or a vulcanization process should be applied. Even in these cases, it was difficult to secure sufficient adhesion force.

However, previously known methods have limitations in maintaining excellent air permeability and tire moldability while sufficiently reducing the thickness and weight of the inner liner.

Moreover, the inner liner manufactured by the previously known methods exhibited reduction of its physical properties, and had cracks generated in the film and the like in a tire manufacturing process during which repeated deformations occur at a high temperature or in an automobile running process during which repeated deformations occur and high heat is generated.

Due to the recent rise in the oil prices, with increasing interest in eco-friendly tires that can improve the fuel efficiency of automobiles, there have been attempts to reduce the weight of the tire or the area of contact of the tire with the ground through a change of the tire compound or a change of the tread design and the like.

However, there was a certain limitation in reducing the weight of tires and improving the fuel efficiency of automobiles while improving the running stability of automobiles or the dimensional stability of tires.

DISCLOSURE OF INVENTION

Technical Problem

It is an object of the present invention to provide a method for manufacturing a polymer film which can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process.

It is another object of the present invention to provide a co-extruded film for an inner liner which can endow an excellent gas barrier property even to tires having a thin thickness, thereby reducing the weight of tires and improving fuel efficiency of automobiles, and ensure high elasticity together with excellent durability and fatigue resistance in a tire manufacturing process or in an automobile running process.

It is a further object of the present invention to provide a pneumatic tire including the above-mentioned co-extruded film for an inner liner.

Technical Solution to Problem

In order to achieve the above object, and other objects which will be become apparent from the description, the present disclosure provides a method for manufacturing a polymer film, the method including a base film forming step of co-extruding a first resin containing a polyamide-based resin and a second resin containing a copolymer including polyamide-based segments and polyether-based segments.

Also, the present disclosure provides a co-extruded film for an inner liner comprising a base film including a first resin layer containing a polyamide-based resin and a second resin layer containing a copolymer including polyamide-based segments and polyether-based segments.

In addition, the present disclosure provides a co-extruded film for an inner liner including a base film including a first resin layer and a second resin layer which have different melt viscosities from each other at a temperature of 200° C. to 300° C.

Further, the present disclosure provides a method for manufacturing a polymer film for an inner liner, the method including a step of co-extruding a first resin layer and a second resin layer which have different melt viscosities from each other at a temperature of 200° C. to 300° C.

Finally, the present disclosure provides a pneumatic tire including the above-mentioned co-extruded film for an inner liner.

The method for manufacturing a polymer film, the co-extruded film for an inner liner, and the pneumatic tire according to specific embodiments of the present invention will now be described in more detail.

In the present disclosure, the terms "first", "second", and the like are used to distinguish objects or elements, and these terms should not restrictively interpreted to specify a certain order or importance and the like.

Also, the term 'segment' refers to a part which congregates while having the same chemical structure in the polymer or the compound, or a specific part having the same physical properties.

For example, the segment may be a specific repeating unit, a chemical structure in which specific repeating units congregate, or a part or a residue derived from reaction materials (a monomer, an oligomer, a polymer, and the like) included in a final reaction product.

In addition, the term 'residue' refers to a form or a chemical structure in which a reaction material participating in a chemical reaction is included in a final product, and for example, it may be a chemical structure, a functional group, or a repeating unit, which is derived from the reaction material, and the like.

Further, the 'alkylene' refers to a divalent functional group derived from alkane, the 'arylene' refers to a divalent functional group derived from arene, and 'aryl alkylene' refers to a divalent functional group derived from a compound containing alkane.

According to one embodiment of the invention, there may be provided a method for manufacturing a polymer film, the method including a base film forming step of co-extruding a first resin containing a polyamide-based resin and a second resin containing a copolymer including polyamide-based segments and polyether-based segments.

The present inventors found through experiments that, when the base film obtained by co-extruding a first resin containing a polyamide-based resin and a second resin containing a copolymer including polyamide-based segments and polyether-based segments is applied to a polymer film for a tire inner liner, it can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process, thereby completing the present invention.

The polymeric film prepared as above may be used for an inner liner of tires, and the polymer film can be a film for an inner liner of a pneumatic tire.

As the second resin and the first resin are co-extruded, in response to the impact and stress applied from the outside, a deployment speed to be applied to the film can be dispersed and a buffering effect can be provided. Also, it is possible to induce an entanglement phenomenon between the co-extruded layers to distribute the external stress and impact in the thickness direction of films, thereby improving toughness and durability of the film.

The base film may have a laminated structure including two or more layers. The base film may not only have a high gas barrier property expressed from a first resin including a polyamide-based resin, but also an elastomeric property expressed from a second resin containing a copolymer including polyamide-based segments and polyether-based segments.

Specifically, the polymer film for an inner liner provided by the manufacturing method of one embodiment of the invention exhibits an excellent gas barrier property, for example an about 10 to 30 times higher gas barrier property as compared to butyl rubber and the like commonly used in tires with the same thickness, and it exhibits a modulus that is not excessively high. Further, the film can inhibit an increase in the stiffness of a film at a high temperature and prevent crystallization at a high temperature.

As described above, the base film may be formed by co-extruding the first resin and the second resin, and a laminated structure of two or more layers may be formed by co-extruding one or more first resins and one or more second resins.

That is, in the base film forming step, one or more first resins and one or more second resins can be co-extruded to form a base film having a multilayer structure including two or more layers.

That is, the base film forming step may further include a step of forming a base film having a multilayer structure including two or more layers by co-extruding one or more first resins and one or more second resins.

Specifically, the base film obtained in the manufacturing method of one embodiment of the invention may be a two-layer structure in which a first resin layer formed from the first resin and a second resin layer formed from the second resin are laminated, and it may be a three-layer structure in which two second resin layers formed from the second resin are laminated to two sides of a first resin layer formed from the first resin, respectively. Alternatively, it may be a three-layer structure in which two first resin layers formed from the first resin are laminated on two sides of the second resin layer formed from the second resin, respectively.

In addition, the base film may be a multilayer structure including two or more first resin layers formed from the first resin and two or more second resin layers formed from the second resin.

The first resin layer and the second resin layer may, respectively, have a thickness of 0.1 μm to 300 μm, 1 μm to 250 μm, or 2 μm to 200 μm.

The base film containing the first resin layer and the second resin layer may have a thickness of 0.2 μm to 3,000 μm, 2 μm to 2,500 μm, 4 μm to 2,000 μm, or 40 μm to 400 μm.

Further, the base film forming step may further include a step of forming a base film with a multilayer structure including two or more layers by using one or more types of the first resins and one or more types of the second resins.

In this case, the first resin may include more polyamide-based resin than the one or more types of the second resins, and the content (wt %) of the polyamide-based resin in the first resin may be 5% to 85% by weight, 10% to 85% by weight, or 25% to 80% by weight higher than the respective contents (wt %) of the polyamide-based resins in the two types of the second resins.

For example, when the difference between the content (wt %) of the polyamide-based resin in the first resin and the content (wt %) of the polyamide-based resin in the second resin is in the range of 5% to 85% by weight, the first resin may include 5% to 100% by weight or 30% to 100% by weight of a polyamide-based resin and 0% to 95% by weight or 0% to 70% by weight of a copolymer including polyamide-based segments and polyether-based segments, and the second resin may include 0% to 95% by weight or 0% to 80% by weight of a polyamide-based resin and 5% to 100% by weight or 20% to 100% by weight of a copolymer including polyaminde-based segments and polyether-based segments.

That is, the content (wt %) of the polyamide-based resin in the first resin may be 5% to 85% by weight, 10% to 85% by weight, or 25% to 80% by weight higher than the respective content (wt %) of the polyamide-based resins in the two types of the second resins.

Meanwhile, the base film forming step may further include a step of forming a base film having a multilayer structure including at least two layers by co-extruding the first resin and one or more types of the second resins including less polyamide-based resin than the first resin.

That is, by co-extruding one type of the first resin and one or more types, or two or more types, of the second resins including less polyamide-based resin (including more copolymer including polyamide-based segments and polyether-based segments) compared to the first resin, a base film having a multilayer structure of two or more layers can be formed.

The process of co-extruding the first resin and the second resin may be carried out at a temperature of 200° C. to 300° C., or 230° C. to 290° C.

The co-extrusion temperature should be higher than the melting point of the polyamide-based compound, but if the temperature is too high, carbonization or decomposition can occur, thereby deteriorating the physical properties of the film. Also, internal cohesion or orientation between the polyether-based segments contained in the second resin occurs, which may be disadvantageous to manufacture an unstretched film.

In the co-extrusion process, a commonly known co-extrusion method or apparatus can be used without particular limitation, except that the above-mentioned first resin and second resin are used.

For example, it is possible to use an extruder or a co-extruder including a raw material injecting part and a combining adaptor in which raw materials transferred from the raw material injecting part are laminated in multiple layers in a molten state. The co-extruder may include two or more extruders and raw material injecting parts in accordance with the number of first resins and second resins used for the preparation of the base film.

In the method for manufacturing the polymer film according to this embodiment, the co-extrusion can use a feed block capable of forming a base film having a multilayer structure.

By using such a feed block, the first resin and the second resin or a molten material thereof to be injected in the extruder or the raw material injecting part can be formed of a multilayer structure. The base film thus prepared can also be continuously discharged through a die to form a film having a multilayer structure.

FIG. 2 schematically illustrates the process of manufacturing the film having a multilayer structure using a feed block.

Any feed block that is known to be usable in the polymer resin or plastic product can be used without particular limitation.

For example, the inside of the feed block includes an inlet pipe through which the polymer is injected from the extruder and a polymer flow-path through which the molten polymers can maintain individual flows. The feed block may include a melt-distributor which serves to form a molten flow at a constant layer thickness ratio and then join the individual molten flows together.

By adjusting the interval of the melt-distributor, it is possible to change the thickness ratio of the layer in which each molten polymer is formed.

Specifically, the molten polymers from the extruder are injected into the feed block through the individual polymer inlet pipe and the polymer path, and then a polymer flow having a laminated structure with a constant thickness ratio is formed by a melt-distributor. Then, while the polymer flow is extruded through a die, it is possible to form a base film having a layer structure within the feed block.

However, specific contents concerning the feed block that can be used in the manufacturing method of the polymer film according to the embodiment of the invention are not limited to the contents described above, and any feed block that is known to be usable in the process of melting and molding the polymer resin can be used without particular limitation.

The base film forming step may further include a step of multilayering a base film by laminating the co-extruded product.

The co-extruded product may have a multilayer structure of two or more layers, and after dividing the co-extruded product in a predetermined thickness ratio, it can be laminated again, thereby multilayering the film so as to have a multilayer structure of four or more layers.

The apparatus or method that can be used in the step of multilayering a base film by laminating the co-extruded product are not particularly limited, and for example, the extruded product can be laminated one or more times through a device such as a layer separating device (or an interfacial surface generator) as shown in FIG. 3, thereby multilayering a base film.

The layer separating device may include a laminate inlet in which a co-extruded laminate is injected, a channel in which laminates are divided, and a stacking part in which the divided laminates are re-laminated. The structure of the laminate introduced into the layer separating device is divided by the channel, and then re-laminated at the stacking part to form a multilayer.

The number of layers of the finally formed multilayered laminate can be adjusted depending on the number of layers and the number of channels of the co-extruded laminated product injected into the layer separating device.

For example, when the co-extruded laminate introduced into the layer separating device has a three-layer structure and the number of channels of the layer separating device is two, the laminate of three-layer structure is divided into the upper channel and the lower channel, respectively, and then a three-layer laminate of the upper channel and a three-layer laminate of the lower channel are laminated together at the stacking part to form a laminate of a six-layer structure. Continuously, when applying one additional layer separating device, a laminate of a 12-layer structure is finally formed.

However, specific contents concerning the layer separating device that can be used in the manufacturing method of the embodiment of the invention are not limited to the contents described above, and any layer separating device that is known to be usable in the process of melting and molding the polymer resin can be used without particular limitation.

The base film forming step may include a step of extruding the co-extruded product or the multilayered co-extruded product in the form of a film.

In the extruding process, any extrusion die that is known to be usable in the extrusion of the polymer resin can be used without particular limitation, but a T-type die is preferably used in order to make the thickness of the base film more uniform or to prevent the occurrence of orientation of the base film.

The base film formed as above may be an unstretched film.

If the base film is in the form of an unstretched film, it has a low modulus and high strain and thus it can be suitably applied to a tire molding process during which high expansion occurs.

Further, in the unstretched film, since the crystallization phenomenon hardly occurs, it is possible to prevent the occurrence of damage such as cracks due to repeated deformations.

Moreover, in the unstretched film, since orientation in a particular direction and deviation in the physical properties are not large, an inner liner having uniform physical properties can be obtained.

Specifically, the base film forming step can be carried out so that the co-extruded product of the first resin and the second resin are not stretched in a machine direction (MD) or in a transverse direction (TD).

Thus, the polymer film for an inner liner manufactured as above may include a co-extruded unstretched base film.

A step of forming a base film in the form of a film with a thickness of 0.2 to 3,000 µm, 2 µm to 2,500 µm, or 4 µm 2,000 µm by cooling the co-extruded products of the first resin and the second resin can be further included.

The melt-extruded product obtained in the above-mentioned co-extruding step may be formed into a film having a uniform thickness while cooling to a predetermined temperature.

Specific devices or methods which can be used in the cooling process are not particularly limited, and for example, it is possible to solidify the product of the co-extrusion process at a cooling part which is cooled at room temperature or maintained at a temperature of 5° C. to 40° C.

Meanwhile, in the step of forming the base film, the thickness of the discharged molten resin sheet can be adjusted by combining a discharge amount of an extruder and a width or gap of a die, a winding speed of a cooling roll, and the like, or the thickness of the base film may be adjusted in the range of 0.2 µm to 3,000 µm, 2 µm to 2,500 µm, or 4 µm to 2,000 µm by uniformly adhering and cooling the film by means of an air knife and air nozzle, a vacuum device, and an electrostatic edge pinning device.

In the manufacturing method of the polymer film according to the embodiment of the invention, the first resin may include only the polyamide-based resin as an essential component, and the second resin may include only a copolymer including polyamide-based segments and polyether-based segments as an essential component.

The first resin may further include a copolymer including polyamide-based segments and polyether-based segments, in addition to the above-mentioned polyamide resin.

The second resin may further include a polyamide-based resin in addition to the copolymer including polyamide-based segments and polyether-based segments.

The first resin may further include the copolymer including polyamide-based segments and polyether-based segments, and when the second resin further includes a polyamide-based resin, the first resin may include more polyamide-based resin than the first resin.

As the second resin and the first resin are co-extruded, it is possible to have a high gas barrier property expressed from the polyamide-based resin, together with an elastomeric property expressed from the copolymer including polyamide-based segments and polyether-based segments.

The difference between the content (wt %) of the polyamide-based resin in the first resin and the content (wt %) of the polyamide-based resin in the second resin may be 5% to 85% by weight, 10% to 85% by weight, or 25% to 80% by weight.

When the difference between the content (wt %) of the polyamide-based resin in the first resin and the content (wt %) of the polyamide-based resin in the second resin is in the range of 5% to 85% by weight, the co-extruded film provided by the method for manufacturing the polymer film according to the embodiment of the invention may have higher gas barrier property and durability, and at the same time, the content of the polyether-based segments contained in the first resin and the second resin can be adjusted to a proper range, and thus the co-extruded film may have characteristics such as high moldability and elasticity.

Specifically, when the difference between the content (wt %) of the polyamide-based resin in the first resin and the content (wt %) of the polyamide-based resin in the second resin is in the range of 5% to 85% by weight, the first resin may include 5% to 100% by weight or 30% to 100% by weight of the polyamide-based resin, and 0% to 95% by weight or 0% to 70% by weight of the copolymer including polyamide-based segments and polyether-based segments, and the second resin may include 0% to 95% by weight or 0% to 80% by weight of the polyamide-based resin, and 5% to 100% by weight or 20% to 100% by weight of the copolymer including polyamide-based segments and polyether-based segments.

Further, in the manufacturing method of the polymer film according to one embodiment of the invention, two second resin layers formed from the second resin are laminated on two sides of the first resin layer formed from the first resin, and thus a base film layer having a laminated structure of three layers can be formed.

In addition, the laminated structure of three layers formed as above can be repeatedly laminated to form a base film having a multilayer structure of greater than three layers.

When the polymer film for an inner liner including the base film layer having a laminated structure of three or more layers manufactured as above is applied to a pneumatic tire, due to the first resin layer located between the two second resin layers, the two second resin layers can secure higher elasticity and lower modulus properties while exhibiting a higher gas barrier property, and therefore the polymer film for an inner liner can exhibit a modulus that is not excessively high, inhibit an increase in the stiffness of the film at a high temperature, and prevent crystallization at a high temperature.

The polyamide-based resin contained in the first resin or contained in the second resin may have a relative viscosity (96% sulfuric acid solution) of 2.5 to 4.0 or 3.0 to 3.8.

When the relative viscosity of the polyamide-based resin is less than 2.5, sufficient elongation may not be secured due to a decrease in toughness, and thus breakage may be generated in a tire manufacturing process or in an automobile running process. Further, since the crystallization rate becomes faster with heat, the effects of delaying crystallization through the control of the brittleness phenomenon of the base film can not be sufficiently exhibited.

When the relative viscosity of the polyamide-based resin is greater than 4.0, the modulus or viscosity of the base film to be manufactured may be unnecessarily increased, the efficiency and economy of the manufacturing process may be lowered, the tire inner liner may be difficult to have a proper moldability and elasticity, and the mixing property with a copolymer including polyamide-based segments and polyether-based segments can be reduced, thereby resulting in irregularities of the physical properties of the base film.

The relative viscosity of the polyamide-based resin refers to a relative viscosity measured using a 96% sulfuric acid solution at room temperature.

Specifically, a specimen of a certain polyamide-based resin (for example, a 0.025 g specimen) is dissolved in a 96% sulfuric acid solution at various concentrations to prepare two or more measurement solutions (for example, a polyamide-based resin specimen is dissolved in 96% sulfuric acid to a concentration of 0.25 g/dL, 0.10 g/dL, and 0.05 g/dL to prepare three measurement solutions), and then the relative viscosity of the measurement solutions (for example, the ratio of the average passing time of the measurement solutions to the passing time of the 96% sulfuric acid solution through a viscosity tube) may be calculated using a viscosity tube at 25° C.

The polyamide-based resin contained in the first resin or contained in the second resin can be used without particular limitation in the specific types as long as it has a relative viscosity (96% sulfuric acid solution) of 2.5 to 4.0.

Specific examples of the polyamide-based resin may include nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or an N-alkoxy alkylate thereof, for example, a methoxy methylate of 6-nylon, a methoxy methylate of 6-610-nylon, or a methoxy methylate of 612-nylon.

The polyamide-based resin contained in the first resin or contained in the second resin may include a polyamide-based copolymer including two or more different repeating units.

The polyamide-based copolymer may include two or more different repeating units, and at least one of the repeating units of the polyamide-based copolymer may include a repeating unit of the following Chemical Formula 1.

[Chemical Formula 1]

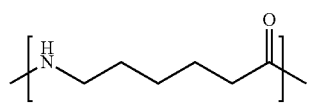

Also, the polyamide-based copolymer may further include a repeating unit of the following Chemical Formula 2 or Chemical Formula 3, in addition to the repeating unit of the Chemical Formula 1.

[Chemical Formula 2]

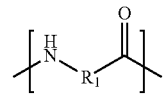

In Chemical Formula 2, $R_1$ is a linear or branched alkylene group having 2 to 4 carbon atoms or 6 to 15 carbon atoms, an arylene group having 6 to 20 carbon atoms, or a linear or branched arylalkylene group having 7 to 20 carbon atoms.

[Chemical Formula 3]

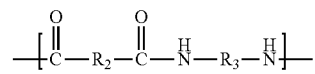

In Chemical Formula 3, $R_2$ is a linear or branched alkylene group having 1 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

The polyamide-based copolymer may contain 0.5% to 20% by weight or 1% to 18% by weight of the repeating unit of Chemical Formula 2.

In addition, the polyamide-based copolymer may contain 0.5% to 20% by weight or 1% to 18% by weight of the repeating unit of Chemical Formula 3.

The polyamide-based copolymer can be synthesized by using two or more monomers, or it can be obtained by copolymerizing two or more polyamide-based polymers.

Specifically, the polyamide-based copolymer may be synthesized by using, as monomers, 2-azetidinone, 2-pirrolidone, δ-valerolactam, 1-aza-2-cyclooctanone, 2-azacyclononanone, 10-aminodecanoic acid, 11-aminoundecanoic acid, laurolactam, or a mixture thereof, in addition to ε-caprolactam, or it may be synthesized by selectively using a dicarboxylic acid and a diamine compound.

The carboxylic acid usable herein may include malonic acid, succinic acid, glutaric acid, adipic acid, pimelic acid, suberic acid, azelaic acid, sebacic acid, dodecanedioic acid, isophtalic acid, terephtalic acid, or a mixture thereof.

In addition, the diamine compound usable herein may include 1,4-diaminobutane, 1,5-diaminopentane, hexamethylene diamine, 1,7-diaminoheptane, 1,8-diaminooctane, 1,10-decanediamine, m-xylene diamine, or a mixture thereof.

Further, the polyamide-based copolymer can be synthesized by copolymerizing a polymer containing the repeating unit of Chemical Formula 1 and a polymer containing the repeating units of Chemical Formula 2 or Chemical Formula 3.

The copolymer including polyamide-based segments and polyether-based segments, contained in the first resin or contained in the second resin, may have a weight average molecular weight of 50,000 to 500,000, or 70,000 to 250,000.

When the weight average molecular weight of the copolymer is less than 50,000, the manufactured base film can not secure sufficient mechanical physical properties required for use in a polymer film for an inner liner. When the weight average molecular weight of the copolymer exceeds 500,000, the modulus or the degree of crystallinity of the base film is excessively increased when heated at a high temperature, and thus it may be difficult to secure elasticity or elastic recovery required for a polymer film for an inner liner.

The polyamide-based segment of the copolymer may include repeating units represented by the following Chemical Formula 11 or Chemical Formula 12.

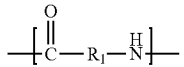

[Chemical Formula 11]

In Chemical Formula 11, $R_1$ is a linear or branched alkylene group having 1 to 20 carbon atoms, an arylene group having 6 to 20 carbon atoms, or a linear or branched arylalkylene group having 7 to 20 carbon atoms.

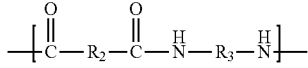

[Chemical Formula 12]

In Chemical Formula 12, $R_2$ is a linear or branched alkylene group having 1 to 20 carbon atoms or an arylene group having 6 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

The polyether-based segment of the copolymer refers to a repeating unit containing an alkylene oxide ('-alkyl-O—') group, and it can be formed from a polyether-based resin or a precursor thereof participating in the polymerization reaction.

The polyether-based segment may be a main repeating unit that may be included in a polyalkylene glycol resin or a derivative thereof. In this case, the polyalkylene glycol derivative may be a derivative in which a terminal of the polyalkylene glycol resin is substituted with an amine group, a carboxyl group, an isocyanate group, or the like, and is preferably substituted with an amine group.

Preferably, the polyether-based segment may be a main repeating unit included in one type of polyether-based resin selected from the group consisting of polyethylene glycol, polypropylene glycol, polytetramethylene glycol, polyoxyethylene diamine, polyoxypropylene diamine, polyoxytetramethylene diamine, and a copolymer thereof.

Further, the polyether-based segment of the copolymer may include a repeating unit of the following Chemical Formula 13.

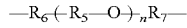

[Chemical Formula 13]

In Chemical Formula 13, $R_5$ is a linear or branched alkylene group having 1 to 10 carbon atoms, n is an integer of 1 to 100, and $R_6$ and $R_7$ may be the same as or different from each other, and are independently a direct bond, —O—, —NH—, —COO—, or —CONH—.

The total content of polyether-based segments in the base film obtained in the above manufacturing method may be 2% to 40% by weight, 3% to 30% by weight, or 4% to 20% by weight.

When the content of polyether-based segments is less than 2% by weight of the overall base film, the modulus of the base film layer or the polymer film for an inner liner is increased, and thus the moldability of the tire is lowered or the physical properties due to repeated deformation may be greatly lowered.

When the content of polyether-based segments exceeds 40% by weight of the overall base film, the gas barrier property required for the polymer film for an inner liner may be lowered, and the reactivity to the adhesive is reduced and thus it may be difficult for an inner liner to easily bond to a carcass layer. In addition, the elasticity of the base film is increased and thus manufacture of the uniform film may not be easy.

When the content ratio of polyether-based segments in the base film is maintained in the range of 2% to 40% by weight, the copolymer may include polyamide-based segments and polyether-based segments in a predetermined weight ratio.

For example, the copolymer including polyamide-based segments and polyether-based segments may include the polyamide-based segment and the polyether-based segment in a weight ratio of 1:9 to 9:1, 2:8 to 8:2, or 3:7 to 7:3.

Further, when the content ratio of polyether-based segments in the above-described base film is maintained in the range of 2% to 40% by weight or 4% to 20% by weight, the first resin and the second resin can be co-extruded by being used in a weight ratio of 9:1 to 1:9 or 8:2 to 2:8.

Further, even in a case where the first resin further includes a copolymer including polyamide-based segments and polyether-based segments or the second resin further includes a polyamide-based resin, the first resin and the second resin can be co-extruded by adjusting the weight ratio thereof so as to maintain the content ratio [2 wt % to 40 wt %, or 4 wt % to 20 wt %] of the polyether-based segment in the base film manufactured as above.

Each of the first resin and the second resin may further include one or more additives selected from the group consisting of a heat-resistant agent, a crosslinking agent, and an antioxidant.

These additives can be included in an amount of 0.001% to 10% by weight in each of the first resin and second resin.

A step of forming an adhesive layer including a resorcinol-formalin-latex (RFL)-based adhesive on at least one side of the base film can be further included.

The adhesive layer including the resorcinol-formalin-latex (RFL)-based adhesive can be formed by coating the resorcinol-formalin-latex (RFL)-based adhesive on one side of the base film layer, or it can be formed by laminating an adhesive film including a resorcinol-formalin-latex (RFL)-based adhesive on one side of the base film.

Preferably, the adhesive layer forming step can be carried out by the method of coating the resorcinol-formalin-latex (RFL)-based adhesive on one side or both sides of the formed base film and then drying it.

The formed adhesive layer may have a thickness of 0.1 to 20 μm, preferably 0.1 to 10 μm.

The resorcinol-formalin-latex (RFL)-based adhesive may include 2 to 32% by weight, preferably 10% to 20% by weight, of a condensate of resorcinol and formaldehyde, and 68% to 98% by weight, preferably 80% to 90%, of latex.

More specific contents concerning the specific components or the like of resorcinol-formalin-latex (RFL)-based adhesive are as described below.

According to another embodiment of the invention, there may be provided a co-extruded film for an inner liner including a base film which includes a first resin layer containing a polyamide-based resin, and a second resin layer containing a copolymer including polyamide-based segments and polyether-based segments.

As described above, the first resin containing a polyamide-based resin and the second resin layer containing a copolymer including polyamide-based segments and polyether-based segments can be co-extruded to produce a co-extruded film for an inner liner including a base film containing the first resin layer and the second resin layer.

The co-extruded film for the inner liner may have a high gas barrier property expressed from the first resin layer including a polyamide-based resin, together with an elastomeric property expressed from the second resin layer including the copolymer including polyamide-based segments and polyether based segments.

Thus, the co-extruded film for the inner liner can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process.

Specifically, the co-extruded film for the inner liner according to one embodiment of the invention can exhibit a modulus that is not excessively high, while exhibiting an excellent gas barrier property, for example an about 10 to 20 times higher gas barrier property than butyl rubber generally used in tires at the same thickness, thereby inhibiting an increase in the stiffness of a film at a high temperature and preventing crystallization at a high temperature.

The base film may have a multilayer structure of two or more layers including at least one of the first resin layer and at least one second of the resin layer.

By including a base film including the first resin layer and the second resin layer, the co-extruded film for the inner liner according to the embodiment of the invention may have high elasticity and low modulus properties while ensuring a more enhanced gas barrier property.

In particular, compared to polymer films with equivalent thicknesses, including both the polyamide-based resin and the copolymer containing polyamide-based segments and polyether-based segments, the co-extruded film for the inner liner according to the embodiment of the invention can achieve improved durability together with a higher gas barrier property.

The first resin layer may include only the polyamide-based resin as an essential component, and the second resin layer may include only the copolymer as an essential component.

The first resin layer may further include a copolymer containing polyamide-based segments and polyether-based segments in addition to the above-described polyamide-based resin.

The second resin layer may further include a polyamide-based resin in addition to the copolymer containing polyamide-based segments and polyether-based segments.

In addition, the first resin layer further includes a copolymer containing polyamide-based segments and polyether-based segments, and the second resin layer further includes a polyamide-based resin. The first resin layer may include more polyamide-based resin than the second resin layer.

A difference between the content (wt %) of the polyamide-based resin in the first resin layer and the content (wt %) of the polyamide-based resin in the second resin layer may be 5% to 85% by weight, 10% to 85% by weight, or 25% to 80% by weight.

When the difference between the content (wt %) of the polyamide-based resin in the first resin layer and the content (wt %) of the polyamide-based resin in the second resin layer is within the above range, the co-extruded film of the above embodiment may have a higher gas barrier property and durability, and at the same time, as the content of the polyether-based segment contained in the first resin layer and the second resin layer is adjusted to an appropriate range, the co-extruded film may have characteristics such as high moldability and elasticity.

Specifically, the first resin layer may include 5% to 100% by weight or 30% to 100% by weight of the polyamide-based resin, and 0% to 95% by weight or 0% to 70% by weight of the copolymer including polyamide-based segments and polyether-based segments.

Also, the second resin layer may include 0% to 95% by weight or 0% to 80% by weight of the polyamide-based resin, and 5% to 100% by weight or 20% to 100% by weight of the copolymer including polyamide-based segments and polyether-based segments.

The base film may have a multilayer structure of two or more layers including the first resin layer and one or more types of the second resin layer containing less polyamide-based resin than the first resin layer.

That is, as described above, the base film having a multilayer structure of two or more layers can be formed by co-extruding one type of the first resin and one or more, or two or more, types of the second resins including less polyamide-based resin (including more copolymer including polyamide-based segments and polyether-based segments) than the first resin. Thereby, the base film includes the one type of the first resin layer and the one or more types of the second resin layers including less polyamide-based resin then the first resin layer.

The total content of polyether-based segments in the base film may be 2% to 40% by weight, 3% to 30% by weight, or 4% to 20% by weight.

The total content of polyether-based segments in the base film can be calculated on the basis of the ratio of the total weight of polyether-based segments which can be included in the second resin layer and the first resin layer to the total weight of the base film.

When the content of the polyether-based segment is less than 2% by weight of the entire polymer film, the modulus of the base film or the polymer film for an inner liner is increased and thus the moldability of the tire is lowered or the physical properties due to repeated deformation may be greatly lowered.

When the content of the polyether-based segment exceeds 40% by weight of the entire polymer film, the gas barrier property of the polymer film for an inner liner may be lowered, and reactivity to the adhesive is reduced and thus it may be difficult for an inner liner to easily bond to a carcass layer. In addition, the elasticity of the base film is increased and thus manufacture of the uniform film may not be easy.

Further, in the co-extruded film of one embodiment of the invention, the two second resin layers can be laminated on two sides of the first resin layer, respectively, thereby forming a base film layer having a laminated structure of three layers.

The laminated structure of three layers formed as above can also be repeatedly laminated to form a base film having a multilayer structure of greater than three layers.

When the polymer film for an inner liner including the base film layer having a laminated structure of three or more layers manufactured as described above is applied to a pneumatic tire, due to the first resin layer located between the two second resin layers, the two second resin layers can secure higher elasticity and lower modulus properties while exhibiting a higher gas barrier property, and therefore the polymer film for an inner liner can exhibit a modulus that is not excessively high, inhibit an increase in the stiffness of the film at a high temperature, and prevent crystallization at a high temperature.

The polyamide-based resin contained in the first resin layer and the copolymer contained in the second resin layer can chemically react in the co-extrusion process, whereby the first resin layer and the second resin layer can form a crosslink, thereby forming an interface layer in which the cross-linking reactants of the polyamide-based resin and the copolymer are included between the first resin layer and the second resin layer.

The first resin layer and the second resin layer may, respectively, have a thickness of 0.1 μm to 300 μm, 1 μm to 250 μm, or 2 μm to 200 μm.

The base film containing the first resin layer and the second resin layer may have a thickness of 0.2 μm to 3,000 μm, 2 μm to 2,500 μm, 4 μm to 2,000 μm, or 40 μm to 400 μm.

The polyamide-based resin which can be contained in the first resin or optionally contained in the second resin can have a relative viscosity (96% sulfuric acid solution) of 2.5 to 4.0.

Details of the relative viscosity and specific types of the polyamide-based resin are as described above.

The copolymer including polyamide-based segments and polyether-based segments which can be contained in the first resin or optionally contained in the second resin can have a weight average molecular weight of 50,000 to 500,000.

More details of the weight average molecular weight of the copolymer are as described above.

Each of the first resin and the second resin may further include one or more additives selected from the group consisting of a heat-resistant agent, a crosslinking agent, and an antioxidant.

These additives can be included in an amount of 0.001% to 10% by weight in each of the first resin and the second resin.

The base film may be an unstretched film which is not substantially stretched.

When the base film is in the form of an unstretched film, it has a low modulus and high strain, and thus it can be suitably applied to a tire molding process during which high expansion occurs.

Also, in the unstretched film, the crystallization phenomenon hardly occurs and thus it is possible to prevent the occurrence of damage such as cracks due to repeated deformations. Moreover, orientation in a particular direction and deviation in the physical properties are not large, and thus an inner liner having uniform physical properties can be obtained.

The co-extruded film for an inner liner may further include an adhesive layer formed on one side of the base film and including a resorcinol-formalin-latex (RFL)-based adhesive.

The adhesive layer including a resorcinol-formalin-latex (RFL)-based adhesive has excellent adhesion force and adhesion maintaining performance to the base film layer and the tire carcass layer, and thus it may prevent breakage at the interface between a polymer film for an inner liner film and a carcass layer, which is generated by heat or repeated deformation in a tire manufacturing process or an automobile running process. Therefore, the polymer film for an inner liner can have sufficient fatigue resistance.

It is considered that the main properties of the above-described adhesive layer result from the inclusion of a specific resorcinol-formalin-latex (RFL)-based adhesive having a specific composition.

Previously, as an adhesive for a tire inner liner, a rubber type of tie gum and the like was used, and thus an additional vulcanization process was required.

In contrast, since the adhesive layer includes the resorcinol-formalin-latex (RFL)-based adhesive having a specific composition, it has high reactivity and adhesion force to the base film. Also, without significantly increasing the thickness, it may be compressed under a high temperature heating condition to firmly adhere the base film to a carcass layer.

Thus, the weight of a tire may become lighter, the fuel efficiency of automobiles may be improved, and even if deformations occur repeatedly in a tire manufacturing process or in an automobile running process, the phenomenon of separation between a carcass layer and an inner liner layer or between the base film and the adhesive layer may be prevented.

Moreover, since the adhesive layer may exhibit high fatigue resistance to physical/chemical deformations that may occur in a tire manufacturing process or an automobile running process, it may minimize a decrease in the adhesion force or other physical properties in a manufacturing process under high temperature conditions or in an automobile running process during which mechanical deformation is applied for a long period of time.

Furthermore, the resorcinol-formalin-latex (RFL)-based adhesive may exhibit adhesion performance since cross-linkage between latex and rubber is available. The resorcinol-formalin-latex (RFL)-based adhesive is physically a latex polymer and has low hardness, and thus has a flexible property like rubber. In addition, a chemical bond between a methylol terminal group of the resorcinol-formalin-latex polymer and a base film is possible.

Thus, if the resorcinol-formalin-latex (RFL)-based adhesive is applied to the base film, the film having high moldability and elasticity together with sufficient adhesion performance may be provided.

The resorcinol-formalin-latex (RFL)-based adhesive may include 2% to 32% by weight, preferably 10% to 20% by weight of a condensate of resorcinol and formaldehyde, and 68% to 98% by weight, preferably 80% to 90% by weight of a latex.

The condensate of resorcinol and formaldehyde may be obtained by mixing resorcinol and formaldehyde in a mole ratio of 1:0.3 to 1:3.0, preferably 1:0.5 to 1:2.5, and conducting condensation.

Further, the condensate of resorcinol and formaldehyde may be included in the amount of 2% by weight or more based on the total weight of the adhesive layer in terms of a chemical reaction for excellent adhesion force, and it may be included in the amount of 32% by weight or less so as to secure an adequate fatigue resistance.

The latex may be one latex selected from the group consisting of a natural rubber latex, a styrene/butadiene rubber latex, an acrylonitrile/butadiene rubber latex, a chloroprene rubber latex, and a styrene/butadiene/vinylpyridine rubber latex, or a mixture of two or more thereof.

The latex may be included in the amount of 68% by weight or more based on the total weight of the adhesive layer for softness and an effective cross-linking reaction with rubber, and it may be included in the amount of 98% by weight or less for a chemical reaction with the base film and stiffness of the adhesive layer.

The adhesive layer may further include one or more additives such as a surface tension control agent, a heat resistant agent, an antifoaming agent, and a filler, in addition to the condensate of resorcinol and formaldehyde.

At this time, the surface tension control agent among the additives is applied for uniform coating of the adhesive layer, but it may cause a decrease in adhesion force when introduced in an excessive amount, and thus it may be included in the amount of 2% by weight or less, or 0.0001% to 2% by weight, preferably 1.0% by weight or less, or 0.0001% to 0.5% by weight, based on the total weight of the adhesive layer.

At this time, the surface tension control agent used herein may include one or more selected from the group consisting of a sulfonic acid salt anionic surfactant, a sulfate ester anionic surfactant, a carboxylic acid salt anionic surfactant, a phosphate ester anionic surfactant, a fluorine-based surfactant, a silicone-based surfactant, and a polysiloxane-based surfactant.

The adhesive layer may have a thickness of 0.1 µm to 20 µm, preferably 0.1 µm to 10 µm, more preferably 0.2 µm to 7 µm, and still more preferably 0.3 µm to 5 µm, and it may be formed on one side or both sides of a co-extruded film for an inner liner.

If the thickness of the adhesive layer is too thin, the adhesive layer itself may become thinner when a tire is inflated, a crosslinking adhesion force between the carcass layer and the base film may be lowered, and stress may be concentrated on a part of the adhesive layer to lower fatigue properties.

If the thickness of the adhesive layer is too thick, interface separation at the adhesive layer may occur to lower fatigue properties.

In order to adhere the polymer film for an inner liner film to the carcass layer of a tire, an adhesive layer is generally formed on one side of the base film, but in the case where the polymer film for an inner liner having a multilayer structure is applied, or when adhesion to rubber on both sides is required depending on a tire molding method and a construction design, for example, when the polymer film for an inner liner covers a bead part, the adhesive layer may be preferably formed on two sides of the base film.

According to another embodiment of the invention, a pneumatic tire including the above-mentioned co-extruded film for an inner liner may be provided.

As described above, since the co-extruded film for an inner liner can endow an excellent gas barrier property even to tires having a thin thickness, the pneumatic tire enables light weight compared to a previously known pneumatic tire, thus improving the fuel efficiency of automobiles.

Furthermore, the co-extruded film for an inner liner can secure high elasticity and durability, and crystallization of the film itself or occurrence of damage such as cracks in the film may be prevented in a tire manufacturing process during which significant deformation occurs under high temperature conditions, or in an automobile running process under which repeated deformations are continuously applied. Thereby, the pneumatic tire can secure high running stability and dimensional stability.

The pneumatic tire may have a structure of a conventionally known pneumatic tire except that it includes the aforementioned co-extruded film for an inner liner.

For example, the pneumatic tire may include: a tread portion; a pair of shoulder portions provided on both sides around the tread portion; a pair of sidewall portions respectively linked to the pair of shoulder portions; a pair of bead portions respectively linked to the pair of sidewall portions; a body ply portion which is formed inside the tread portion, the shoulder portion, the sidewall portion, and the bead portion; a belt portion and a cap ply portion which are sequentially laminated between the inside of the tread portion and the body ply portion; and a co-extruded film for an inner liner which is linked to the inside of the body ply portion.

According to another embodiment of the present invention, a co-extruded film for an inner liner including a base film containing the first resin layer and the second resin layer having different melt viscosities from each other at a temperature of 200° C. to 300° C. may be provided.

The present inventors found through experiments that, when a co-extruded film obtained by co-extruding two or more types of resins having different melt viscosities is applied to an inner liner, it can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process, thereby completing the present invention.

The co-extruded film can be used as a tire inner liner, and the co-extruded film can be a co-extruded polymer film for a tire inner liner.

The film for an inner liner according to one embodiment of the invention exhibits an excellent gas barrier property, for example an about 10 to 30 times higher gas barrier property compared to butyl rubber and the like commonly used in tires with the same thickness, and it exhibits a modulus that is not excessively high, thus inhibiting an increase in the stiffness of a film at a high temperature and preventing crystallization at a high temperature.

Specifically, the film for an inner liner according to one embodiment of the invention can exhibit a 20% or more improved gas barrier property while having a weight of 30% or less, compared to an inner liner using a butyl rubber or a copolymer of rubber components.

The co-extruded film refers to a film obtained by co-extruding two or more different resins or raw materials. By co-extruding the two or more different resins or raw materials, the co-extruded film may be a multilayer structure including two or more layers.

The co-extruded film according to one embodiment of the invention can be manufactured by co-extruding two or more resins having different melt viscosities, for example a first resin for forming the first resin layer and a second resin for forming the second resin layer.

In the process of co-extruding two or more resins having different melt viscosities as described above, the flows or streams where the resin having a relatively low melt viscosity moves towards the resin having a relatively high melt viscosity may occur. Thereby, an entanglement phenomenon at the interface between two or more different resins occurs, and thus the finally manufactured co-extruded film can effectively block and distribute the propagation of external stress, thereby having high durability.

Consequently, a higher bonding force between the first resin layer and the second resin layer occurs, and the film for an inner liner using the base film including the first resin layer and the second resin layer can prevent a phenomenon that breakage at the interface occurs, and secure elasticity or the like together with a higher mechanical physical property, thereby preventing the occurrence of breakage or cracks in a tire manufacturing process or in an automobile running process under which repeated deformations and high temperature conditions are applied.

As described above, the first resin layer may have a lower melt viscosity at a temperature of 200° C. to 300° C., 230° C. to 290° C., or 240° C. to 270° C., as compared with the second resin layer.

Specifically, the difference in the melt viscosity between the first resin layer and the second resin layer may be 100 poise to 3,000 poise, 200 poise to 2,500 poise, or 300 poise or 1,500 poise at a temperature of 240° C. to 270° C. and a shear rate of 500 $s^{-1}$.

When the difference in the melt viscosity between the first resin layer and the second resin layer is too small, the bonding force between the first resin layer and the second resin layer may not be sufficiently secured, and it may be difficult to produce an entanglement phenomenon at the interface and to secure uniform physical properties.

In addition, when the difference in the melt viscosity between the first resin layer and the second resin layer is too large, the melt flow property is deteriorated and a phenomenon where a low-viscosity resin is cornered or driven to the edge of a die upon die-type discharge occurs, and thus the production of a uniform co-extruded film may not be easy.

The first resin layer may have a melt viscosity of 600 poise to 6,000 poise, 700 poise to 5,500 poise, or 800 poise to 4,000 poise at a temperature of 240° C. to 270° C. and a shear rate of 500 $s^{-1}$.

The second resin layer may have a melt viscosity of 700 poise to 9,000 poise, 800 poise to 8,000 poise, or 1,000 poise to 5,000 poise at a temperature of 240° C. to 270° C. and a shear rate of 500 $s^{-1}$.

As described above, the first resin layer and the second resin layer may lead to an entanglement phenomenon between polymer chains in the co-extrusion process, whereby the first resin layer and the second resin layer can form a physical bond between the interfaces, thereby forming an interface layer in which the cross-linking reaction or physical bond between the components is included between the first resin layer and the second resin layer.

The co-extruded film of this embodiment may include a base film including a first resin layer and a second resin layer, each of which includes a polyamide-based resin, and a copolymer including polyamide-based segments and polyether-based segments, and the first resin layer may have a low melt viscosity at a temperature of 200° C. to 300° C. as compared with the second resin layer.

Each of the first resin layer and the second resin layer included in the base film may include one or more compounds selected from the group consisting of a polyamide-based resin, and a copolymer including polyamide-based segments and polyether-based segments. That is, each of the first resin layer and the second resin layer may include a polyamide-based resin, or it may include both the polyamide-based resin and the copolymer.

As the second resin and the first resin are co-extruded, it is possible to have a high gas barrier property expressed from the polyamide-based resin, together with an elastomeric property expressed from the copolymer including polyamide-based segments and polyether-based segments.

Within a range in which the first resin layer has a low melt viscosity at a temperature of 200° C. to 300° C. or 240° C. to 270° C. as compared with the second resin layer, each of the first resin layer and the second resin layer may include one or more compounds selected from the group consisting of a polyamide-based resin, and a copolymer including polyamide-based segments and polyether-based segments.

Further, each of the first resin layer and the second resin layer may include one or more compounds selected from the group consisting of a polyamide-based resin, and a copolymer including polyamide-based segments and polyether-based segments, so that the difference in the melt viscosity between the first resin layer and the second resin layer can become 100 poise to 3,000 poise at a temperature of 240° C. to 270° C. and a shear rate of 500 $s^{-1}$.

Within a range in which the first resin layer has a melt viscosity of 600 poise to 6,000 poise at a temperature of 240° C. to 270° C. and a shear rate of 500 $s^{-1}$ or the second resin layer has a melt viscosity of 700 poise to 9,000 poise at a temperature of 240° C. to 270° C. and a shear rate of 500 $s^{-1}$, each of the first resin layer and the second resin layer may include one or more compounds selected from the group consisting of a polyamide-based resin, and a copolymer including polyamide-based segments and polyether-based segments.

The range of the component and the content included in the first resin layer and the second resin layer is not particularly limited within a range of satisfying the above-described content concerning the melt viscosity. Preferably, the first resin layer may include 0% to 90% by weight of the polyamide-based resin, and 10% to 100% by weight of the copolymer including polyamide-based segments and polyether-based segments, and the second resin layer may include 5% to 95% by weight of the polyamide-based resin, and 5% to 95% by weight of the copolymer including polyamide-based segments and polyether-based segments.

Further, the first resin layer may include 1% to 60% by weight of the polyamide-based resin, and 40% to 99% by weight of the copolymer including polyamide-based segments and polyether-based segments, and the second resin layer may include 25% to 90% by weight of the polyamide-based resin, and 10% to 75% by weight of the copolymer including polyamide-based segments and polyether-based segments.

The total content of polyether-based segments in the base film may be 2% to 40% by weight, 3% to 35% by weight, 4% to 30% by weight, or 5% to 25% by weight.

The total content of polyether-based segments in the base film can be calculated on the basis of the ratio of the total weight of polyether-based segments which can be included in the second resin layer and the first resin layer to the total weight of the base film.

When the content of polyether-based segments is less than 2% by weight of the overall base film, the modulus of the base film or the polymer film for an inner liner is increased and thus the moldability of the tire is lowered or the physical properties due to repeated deformation may be greatly lowered.

When the content of polyether-based segments exceeds 40% by weight of the overall base film, the gas barrier property required for the polymer film for an inner liner may be lowered and the reactivity to the adhesive is reduced, and thus it may be difficult for an inner liner to easily bond to a carcass layer. In addition, the elasticity of the base film is increased and thus manufacture of a uniform film may not be easy.

The polyamide-based resin which can be contained in each of the first resin or the second resin can have a relative viscosity (96% sulfuric acid solution) of 2.5 to 4.0, or 3.0 to 3.8.

When the relative viscosity of the polyamide-based resin is less than 2.5, sufficient elongation may not be secured due to a decrease in toughness, and thus breakage may be generated in a tire manufacturing process or in an automobile running process. Further, since the crystallization rate becomes faster with heat, the effects of delaying crystallization through the control of the brittleness phenomenon of the base film can not be sufficiently exhibited.

When the relative viscosity of the polyamide-based resin is greater than 4.0, the modulus or viscosity of the base film to be manufactured may be unnecessarily increased, the efficiency and economy of the manufacturing process may be lowered, it may be difficult for the inner liner to have proper moldability or elasticity, and the mixing property with a copolymer including polyamide-based segments and polyether-based segments can be reduced, thereby resulting in irregularities of the physical properties of the base film.

The relative viscosity of the polyamide-based resin refers to a relative viscosity measured using a 96% sulfuric acid solution at room temperature.

Specifically, a specimen of a certain polyamide-based resin (for example, a 0.025 g specimen) is dissolved in a 96% sulfuric acid solution at various concentrations to prepare two or more measurement solutions (for example, a polyamide-based resin specimen is dissolved in 96% sulfuric acid to a concentration of 0.25 g/dL, 0.10 g/dL, and 0.05 g/dL to prepare three measurement solutions), and then the relative viscosity of the measurement solutions (for example, the ratio of the average passing time of the measurement solutions to the passing time of the 96% sulfuric acid solution through a viscosity tube) may be calculated using a viscosity tube at 25° C.

The polyamide-based resin can be used without particular limitation in the specific types as long as it has a relative viscosity (96% sulfuric acid solution) of 2.5 to 4.0.

Specific examples of the polyamide-based resin may include nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or an N-alkoxy alkylate thereof, for example, a methoxy methylate of 6-nylon, a methoxy methylate of 6-610-nylon, or a methoxy methylate of 612-nylon.

Further, the polyamide-based resin contained in the first resin or the second resin may include a polyamide-based copolymer including two or more different repeating units.

The polyamide-based copolymer may include two or more different repeating units, and at least one of the repeating units of the polyamide-based copolymer may include a repeating unit of the following of the following Chemical Formula 1.

[Chemical Formula 1]

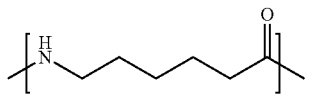

The polyamide-based copolymer may further include a repeating unit of the following Chemical Formula 2 or Chemical Formula 3 in addition to a repeating unit of Chemical Formula 1, and it may include a repeating unit of the following Chemical Formula 2 or a repeating unit of Chemical Formula 3 together.

[Chemical Formula 2]

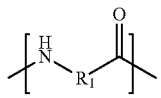

In Chemical Formula 2, $R_1$ is a linear or branched alkylene group having 2 to 4 carbon atoms or 6 to 15 carbon atoms, an arylene group having 6 to 20 carbon atoms, or a linear or branched arylalkylene group having 7 to 20 carbon atoms.

[Chemical Formula 3]

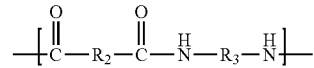

In Chemical Formula 3, $R_2$ is a linear or branched alkylene group having 1 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

The polyamide-based copolymer may contain 0.5% to 20% by weight or 1% to 18% by weight of the repeating unit of Chemical Formula 2.

In addition, the polyamide-based copolymer may contain 0.5% to 20% by weight or 1% to 18% by weight of the repeating unit of Chemical Formula 3.

The polyamide-based copolymer can be synthesized by using two or more monomers, or it can be obtained by copolymerizing two or more polyamide-based polymers.

Specifically, the polyamide-based copolymer may be synthesized by using, as monomers, 2-azetidinone, 2-pirrolidone, δ-valerolactam, 1-aza-2-cyclooctanone, 2-azacyclononanone, 10-aminodecanoic acid, 11-aminoundecanoic acid, laurolactam, or a mixture thereof, in addition to ε-caprolactam, or it may be synthesized by selectively using a dicarboxylic acid and a diamine compound.

The carboxylic acid usable herein may include malonic acid, succinic acid, glutaric acid, adipic acid, pimelic acid, suberic acid, azelaic acid, sebacic acid, dodecanedioic acid, isophtalic acid, terephtalic acid, or a mixture thereof.

In addition, the diamine compound usable herein may include 1,4-diaminobutane, 1,5-diaminopentane, hexamethylene diamine, 1,7-diaminoheptane, 1,8-diaminooctane, 1,10-decanediamine, m-xylene diamine, or a mixture thereof.

Further, the polyamide-based copolymer can be synthesized by copolymerizing a polymer containing the repeating unit of Chemical Formula 1 and a polymer containing the repeating unit of Chemical Formula 2 or Chemical Formula 3.

The copolymer including polyamide-based segments and polyether-based segments, which can be contained in the first resin or the second resin, may have a weight average molecular weight of 50,000 to 500,000, or 70,000 to 300,000.

When the weight average molecular weight of the copolymer is less than 50,000, the manufactured base film can not have sufficient mechanical physical properties required for use in a film for an inner liner. When the weight average molecular weight of the copolymer exceeds 500,000, the modulus or the degree of crystallinity of the base film is excessively increased when heated at a high temperature, and thus it may be difficult to secure elasticity or elastic recovery required for a film for an inner liner.

The polyamide-based segment of the copolymer may include repeating units represented by the following Chemical Formula 11 or Chemical Formula 12.

[Chemical Formula 11]

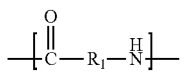

In Chemical Formula 11, $R_1$ is a linear or branched alkylene group having 1 to 20 carbon atoms, an arylene group having 6 to 20 carbon atoms, or a linear or branched arylalkylene group having 7 to 20 carbon atoms.

[Chemical Formula 12]

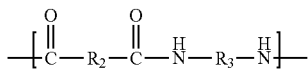

In Chemical Formula 12, $R_2$ is a linear or branched alkylene group having 1 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

The polyether-based segment of the copolymer refers to a repeating unit containing an alkylene oxide ('-alkyl-O—') group, and it can be formed from a polyether-based resin or a precursor thereof participating in the polymerization reaction.

The polyether-based segment of the copolymer may be a main repeating unit that may be included in a polyalkylene glycol resin or a derivative thereof. In this case, the polyalkylene glycol derivative may be a derivative in which a terminal of the polyalkylene glycol resin is substituted with an amine group, a carboxyl group, an isocyanate group, or the like, and is preferably substituted with an amine group.

Preferably, the polyether-based segment of the copolymer may be a main repeating unit included in one type of polyether-based resin selected from the group consisting of polyethylene glycol, polypropylene glycol, polytetramethylene glycol, polyoxyethylene diamine, polyoxypropylene diamine, polyoxytetramethylene diamine, and a copolymer thereof.

Further, the polyether-based segment of the copolymer may include a repeating unit of the following Chemical Formula 13.

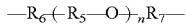   [Chemical Formula 13]

In Chemical Formula 13, $R_5$ is a linear or branched alkylene group having 1 to 10 carbon atoms, n is an integer of 1 to 100, and $R_6$ and $R_7$ may be the same as or different from each other, and are independently a direct bond, —O—, —NH—, —COO—, or —CONH—.

When the content ratio of polyether-based segments in the base film is maintained in the range of 2% to 40% by weight, the copolymer may include polyamide-based segments and polyether-based segments in a predetermined weight ratio.

For example, the copolymer including polyamide-based segments and polyether-based segments may include the polyamide-based segment and the polyether-based segment in a weight ratio of 1:9 to 9:1, 2:8 to 8:2, or 3:7 to 7:3.

Further, when the content ratio of polyether-based segments in the above-described base film is maintained in the range of 2% to 40% by weight, the first resin and the second resin can be co-extruded by being used in a weight ratio of 9:1 to 1:9, or 8:2 to 2:8.

The base film may include one or more first resin layers and one or more second resin layers, respectively.

The base film may have a multilayer structure of two or more layers including one or more first resin layers and one or more second resin layers.

By including a co-extruded film containing the first resin layer and the second resin layer, the co-extruded film of this embodiment may have high elasticity and low modulus properties while securing more improved gas barrier properties.

Specifically, the base film included in the co-extruded film of one embodiment of the invention may be a two-layer structure in which a first resin layer and a second resin layer are laminated, and it may be a three-layer structure in which two second resin layers are laminated on two sides of the first resin layer. Alternatively, it may be a three-layer structure in which two first resin layers formed from the first resin are laminated on two sides of the second resin layer.

In addition, the base film may be a multilayer structure including two or more first resin layers and two or more second resin layers, respectively.

The first resin layer and the second resin layer may, respectively, have a thickness of 0.1 μm to 300 μm, 1 μm to 250 μm, or 2 μm to 200 μm.

The base film may have a thickness of 0.2 μm to 3,000 μm, 2 μm to 2,500 μm, 4 μm to 2,000 μm, or 40 μm to 400 μm.

Each of the first resin and the second resin may further include one or more additives selected from the group consisting of a heat-resistant agent, a crosslinking agent, and an antioxidant.

These additives can be included in an amount of 0.001% to 10% by weight in each of the first resin layer and the second resin layer.

The base film may be an unstretched film that is not substantially stretched.

If the base film is in the form of an unstretched film, it has a low modulus and high strain, and thus it can be suitably applied to a tire molding process during which high expansion occurs.

Further, in the unstretched film, since the crystallization phenomenon hardly occurs, it is possible to prevent the occurrence of damage such as cracks due to repeated deformations. Moreover, in the unstretched film, since orientation in a particular direction and deviation in the physical properties are not large, an inner liner having uniform physical properties can be obtained.

The co-extruded film is formed on at least one side of the base film, and it may further include an adhesive layer including a resorcinol-formalin-latex (RFL)-based adhesive.

The adhesive layer including the resorcinol-formalin-latex (RFL)-based adhesive may have excellent adhesion force and adhesion maintaining performance to the base film and the tire carcass layer, and thus it may prevent breakage at the interface between an inner liner film and a carcass layer, which is generated by heat or repeated deformation in a tire manufacturing process or an automobile running process. Therefore, the film for an inner liner may have sufficient fatigue resistance.

It is considered that the main properties of the above-described adhesive layer result from the inclusion of a specific resorcinol-formalin-latex (RFL)-based adhesive having a specific composition.

Previously, as an adhesive for an inner liner, a rubber type of tie gum and the like was used, and thus an additional vulcanization process was required.

In contrast, since the above adhesive layer includes the resorcinol-formalin-latex (RFL)-based adhesive having a specific composition, it has high reactivity and adhesion force to the base film, and also without significantly increasing the thickness, it may be compressed under a high temperature heating condition to firmly adhere the base film to a carcass layer.

Thus, the weight of a tire may become lighter, the fuel efficiency of automobiles may be improved, and even if repeated deformations occur in a tire manufacturing process or in an automobile running process, the phenomenon of separation between a carcass layer and an inner liner or between the base film and the adhesive layer may be prevented.

Further, since the adhesive layer may exhibit high fatigue resistance to physical/chemical deformations that may occur in a tire manufacturing process or an automobile running process, it may minimize a decrease in the adhesion force or other physical properties in a manufacturing process under high temperature conditions or in an automobile running process during which mechanical deformation is applied for a long period of time.

Furthermore, the resorcinol-formalin-latex (RFL)-based adhesive may exhibit adhesion performance since cross-linkage between latex and rubber is available. Since the resorcinol-formalin-latex (RFL)-based adhesive is physically a latex polymer, the hardness is low and it can have a flexible property like rubber. In addition, a chemical bond between a methylol terminal group of the resorcinol-formalin-latex polymer and a base film is possible.

Thus, if the resorcinol-formalin-latex (RFL)-based adhesive is applied to the base film, the film having high moldability and elasticity together with sufficient adhesion performance may be provided.

The resorcinol-formalin-latex (RFL)-based adhesive may include 2% to 32% by weight, preferably 10% to 20% by weight of a condensate of resorcinol and formaldehyde, and 68% to 98% by weight, preferably 80% to 90% by weight of a latex.

The condensate of resorcinol and formaldehyde may be obtained by mixing resorcinol and formaldehyde in a mole ratio of 1:0.3 to 1:3.0, preferably 1:0.5 to 1:2.5, and then conducting condensation.

Further, the condensate of resorcinol and formaldehyde may be included in the amount of 2% by weight or more based on the total weight of the adhesive layer in terms of a chemical reaction for excellent adhesion force, and it may be included in the amount of 32% by weight or less so as to secure adequate fatigue resistance.

The latex may be one selected from the group consisting of a natural rubber latex, a styrene/butadiene rubber latex, an acrylonitrile/butadiene rubber latex, a chloroprene rubber latex, and a styrene/butadiene/vinylpyridine rubber latex, and a mixture of two or more thereof.

The latex may be included in the amount of 68% by weight or more based on the total weight of the entire adhesive layer for softness of the material and an effective cross-linking reaction with rubber, and it may be included in the amount of 98% by weight or less for a chemical reaction with the base film and stiffness of the adhesive layer.

The adhesive layer may further include one or more additives such as a surface tension control agent, a heat resistant agent, an antifoaming agent, and a filler, in addition to the condensate of resorcinol and formaldehyde.

The surface tension control agent among the additives is applied for uniform coating of the adhesive layer, but it may cause a decrease in adhesion force when injected in an excessive amount, and thus it may be included in the amount of 2% by weight or less, or 0.0001% to 2% by weight, preferably 1.0% by weight or less, or 0.0001% to 0.5% by weight, based on the total weight of the entire adhesive layer.

The surface tension control agent used herein may include one or more selected from the group consisting of a sulfonic acid salt anionic surfactant, a sulfate ester anionic surfactant, a carboxylic acid salt anionic surfactant, a phosphate ester anionic surfactant, a fluorine-based surfactant, a silicone-based surfactant, and a polysiloxane-based surfactant.

The adhesive layer may have a thickness of 0.1 μm to 20 μm, preferably 0.1 μm to 10 μm, more preferably 0.2 μm to 7 μm, and still more preferably 0.3 μm to 5 μm, and it may be formed on one side or both sides of the co-extruded film.

If the thickness of the adhesive layer is too thin, the adhesive layer itself may become thinner when a tire is inflated, cross-linking adhesion force between a carcass layer and a base film may be lowered, and stress may be concentrated on a part of the adhesive layer to lower the fatigue property.

Also, if the thickness of the adhesive layer is too thick, interface separation at the adhesive layer may occur to lower the fatigue property.

In order to adhere the inner liner film to the carcass layer of a tire, an adhesive layer is generally formed on one side of the base film, but in the case where the inner liner film having a multilayer structure is applied, or when adhesion to rubber on both sides is required depending on a tire molding method and a construction design, for example, when the inner liner film covers a bead part, the adhesive layer may be preferably formed on two sides of the base film.

According to another embodiment of the invention, a pneumatic tire including the co-extruded film as an inner liner may be provided.

As described above, since the co-extruded film can endow an excellent gas barrier property even to tires having a thin thickness, the pneumatic tire including the co-extruded film as an inner liner enables light weight compared to a previously known pneumatic tire, thus improving the fuel efficiency of automobiles.

Furthermore, the co-extruded film can secure high elasticity and durability, and crystallization of the film itself or the occurrence of damage such as cracks in the film may be prevented in a tire manufacturing process during which significant deformation occurs under high temperature conditions, or in an automobile running process under which repeated deformations are continuously applied. Thereby, the pneumatic tire can ensure high running stability and dimensional stability.

The pneumatic tire may have a structure of a conventionally known pneumatic tire, except that it includes the aforementioned co-extruded film as an inner liner.

For example, the pneumatic tire may include: a tread portion; a pair of shoulder portions provided on both sides around the tread portion; a pair of sidewall portions respectively linked to the pair of shoulder portions; a pair of bead portions respectively linked to the pair of sidewall portions; a body ply portion which is formed inside the tread portion, the shoulder portion, the sidewall portion, and the bead portion; a belt portion and a cap ply portion which are sequentially laminated between the inside of the tread portion and the body ply portion; and an inner liner including the co-extruded film of one embodiment of the invention which is linked to the inside of the body ply portion.

According to another embodiment of the invention, a method for manufacturing a co-extruded film for an inner liner including a step of co-extruding a first resin and a second resin having different melt viscosities from each other at a temperature of 200° C. to 300° C. may be provided.

In the process of co-extruding two or more resins having different melt viscosities as described above, the flows or streams where the resin having a relatively low melt viscosity moves towards the resin having a relatively high melt viscosity may occur. Thereby, an entanglement phenomenon between interfaces can occur, and thus a phenomenon where a stress applied from the outside is propagated can be blocked and dispersed to improve durability.

That is, while moving or flowing to layers formed from the first resin and the second resin having a lower melt viscosity at the interface of the layers formed from the first resin and the second resin, a physical entanglement phenomenon can be prevented.

Consequently, a higher bonding force between layers formed from the first resin and the second resin occurs, and the film for an inner liner using the base film formed as above can prevent a phenomenon where breakage at the interface occurs, and also secure elasticity or the like together with a higher mechanical physical property, thereby preventing the occurrence of breakage or cracks in a tire manufacturing process or in an automobile running process under which repeated deformations and high temperature conditions are applied.

As described above, the first resin layer may have a lower melt viscosity at a temperature of 200° C. to 300° C., or 240° C. to 270° C., as compared with the second resin layer.

Specifically, the difference in the melt viscosity between the first resin and the second resin may be 100 poise to 3,000 poise, 200 poise to 2,500 poise, or 300 poise to 1,500 poise at a temperature of 240° C. to 270° C. and a shear rate of 500 s$^{-1}$.

When the difference in the melt viscosity between the first resin and the second resin is too small, the bonding force between the first resin and the second resin may not be sufficiently secured, and it is difficult to produce an entanglement phenomenon between interfaces and thus it is difficult to achieve an isotropic physical property.

Further, when the difference in the melt viscosity between the first resin and the second resin is too large, the melt flow is deteriorated, and a phenomenon where a low-viscosity resin is cornered or driven to the edge of a die upon die-type discharge occurs, and thus the production of the uniform co-extruded film may not be easy.

The film for an inner liner provided by the manufacturing method of the invention exhibits an excellent gas barrier property, for example an about 10 to 20 times higher gas barrier property compared to butyl rubber and the like commonly used in tires with the same thickness, and it exhibits a modulus that is not excessively high, thus inhibiting an increase in the stiffness of a film at a high temperature and preventing crystallization at a high temperature.

Specifically, the film for an inner liner according to one embodiment of the invention can achieve a 20% or more improved gas barrier property while having a weight of 30% or less, compared to an inner liner using a butyl rubber or a copolymer of rubber components.

The method for manufacturing a polymer film according to this embodiment may include a base film forming step including co-extruding a first resin and a second resin, which includes one or more compounds selected from the group consisting of polyamide-based resins, and a copolymer including polyamide-based segments and polyether-based segments, and the first resin layer may have a low melt viscosity at a temperature of 200° C. to 300° C. as compared with the second resin layer.

The film for an inner liner obtained by co-extruding a polyamide-based resin; and two or more types of resins having different melt viscosities and one or more compounds selected from the group consisting of a copolymer including polyamide-based segments and polyether-based segments, can endow an excellent gas barrier property even to tires having a thin thickness, thereby reducing the weight of tires and improving the fuel efficiency of automobiles, and ensure high elasticity together with excellent durability and fatigue resistance in a tire preparation process or in an automobile running process.

The first resin may have a melt viscosity of 600 poise to 6,000 poise, 700 poise to 5,500 poise, or 800 poise to 4,000 poise at a temperature of 240° C. to 270° C. and a shear rate of 500 s$^{-1}$.

The second resin may have a melt viscosity of 700 poise to 9,000 poise, 800 poise to 8,000 poise, or 1,000 poise to 5,000 poise at a temperature of 240° C. to 270° C. and a shear rate of 500 s$^{-1}$.

The base film forming step may include a step of co-extruding the first resin and the second resin while injecting at a rate of 5 to 2500 kg/h.

The speed at which the first resin and the second resin are injected in the co-extrusion step may be determined in consideration of specific physical properties of the first resin and the second resin and the physical properties and size of the manufactured base film. For example, the first resin and the second resin can be co-extruded while injecting at a speed of 5 to 2500 kg/h.

As described above, the base film may be formed by co-extruding the first resin and the second resin, and a laminated structure of two or more layers may be formed by co-extruding one or more first resins and one or more second resins, respectively.

That is, in the base film forming step, one or more first resins and one or more second resins can be co-extruded to form a base film with a multilayer structure including two or more layers.

In the method for manufacturing a polymer film according to this embodiment, the base film forming step may further include a step of co-extruding one or more first resins and one or more second resins to form a base film of a multilayer structure including two or more layers.

Specifically, the base film obtained in the manufacturing method of one embodiment of the invention may be a two-layer structure in which a first resin layer formed from the first resin and a second resin layer formed from the second resin are laminated, and it may be a three layer structure in which two second resin layers formed from the second resin are laminated on two sides of the first resin layer formed from the first resin, respectively. Alternatively, it may be a three-layer structure in which two first resin layers formed from the first resin are laminated on two sides of the second resin layer formed from the second resin, respectively.

In addition, the base film may be a multilayer structure including two or more first resin layers formed from the first resin and two or more second resin layers formed from the second resin.

Further, in the manufacturing method of the polymer film according to one embodiment of the invention, each of two second resin layers formed from the second resin can be laminated on two sides of the first resin layer formed from the first resin, to form a base film layer having a laminated structure of three layers.

Further, the laminated structure of three layers formed as above can be repeatedly laminated to form a base film having a multilayer structure of greater than three layers.

The base film having a laminated structure of two or more layers manufactured as above has a modulus that is not excessively high, and prevents an increase in stiffness of the film and crystallization at a high temperature. Thus, when the film for an inner liner including the base film is applied to a pneumatic tire, it can secure higher elasticity and lower modulus properties while exhibiting a higher gas barrier property, thus exhibiting high durability.

The base film formed through the co-extrusion may include a first resin layer with a thickness of 0.1 µm to 300 µm derived from the first resin, and a second resin layer with a thickness of 0.1 µm to 300 µm derived from the second resin.

Specifically, the first resin layer and the second resin layer may each have a thickness of 0.1 µm to 300 µm, 1 µm to 250 µm, or 2 µm to 200 µm.

Also, the base film containing the first resin layer and the second resin layer may have a thickness of 0.2 µm to 3,000 µm, 2 µm to 2,500 µm, 4 µm to 2,000 µm, or 40 µm to 400 µm.

The step of co-extruding the first resin and the second resin can be carried out at a temperature of 200° C. to 300° C., or 230° C. to 290° C., or 240° C. to 270° C.

The co-extrusion temperature should be higher than a melting point of a polyamide-based compound. However, if the co-extrusion temperature is excessively high, carbonization or decomposition may occur to deteriorate physical properties of a film. Further, internal cohesion between polyether-based segments that are contained in the first resin or the second resin may occur, or orientation may be generated, which may be disadvantageous to manufacture an unstretched film.

In the co-extrusion process, a commonly known co-extrusion method or apparatus can be used without particular limitation, except that the above-mentioned first resin and second resin are used.

For example, it is possible to use an extruder or a co-extruder including a raw material injecting part and a combining adaptor in which raw materials transferred from the extruder or the raw material injecting part are laminated in multiple layers in a molten state. The co-extruder may include two or more extruders and raw material injecting parts in accordance with the number of first and second resins used for the preparation of the base film.

In the method for manufacturing the polymer film according to this embodiment, the co-extrusion can use a feed block capable of forming a base film having a multilayer structure.

By using such a feed block, the first resin and the second resin or a molten material thereof to be injected in the extruder or the raw material injecting part can be formed into a multilayer structure. The base film thus prepared can also be formed into a multilayer structure, and the multilayer structure formed from the feed block can be continuously discharged through a die to form a film having a multilayer structure.

FIG. 2 schematically illustrates the process of manufacturing the film having a multilayer structure using the feed block.

Any feed block that is known to be usable for a polymer resin or plastic product can be used without particular limitation.

For example, the inside of the feed block includes an inlet pipe through which the polymer is injected from the extruder and a polymer flow-path that the molten polymers can maintain individual flows. The feed block may include a melt-distributor which serves to form a molten flow in a constant layer thickness ratio and then join the individual flows together.

By adjusting the interval of the melt-distributor, it is possible to change the thickness ratio of the layer in which each molten polymer is formed.

Specifically, the molten polymers from the extruder are injected into the feed block through the individual polymer inlet pipe and the flow path and then a polymer flow having a laminated structure with a constant thickness ratio by a melt-distributor is formed. Then, while being extruded through a die, it is possible to form a base film of a layer structure formed in the feed block.

However, in the method for manufacturing a polymer film according to this embodiment, an entanglement phenomenon between the interfaces is generated due to a difference in the viscosity between the polymer layers in the process of flowing the polymer to a die via a melt-distributor. Under a predetermined condition, a phenomenon in which an inner layer and an outer layer are reversed by the layer reversal phenomenon can also be induced, thus causing a more complete entanglement phenomenon of polymer chains.

Furthermore, specific contents concerning the feed block that can be used in the manufacturing method of the polymer film according to the embodiment of the invention are not limited to the contents described above, and any feed block which is known to be usable in the process of melting and molding the polymer resin can be used without particular limitation.

The base film forming step may further include a step of multilayering a base film by laminating the co-extruded product.

The co-extruded product may have a multilayer structure of two or more layers, and after dividing the co-extruded product in a predetermined thickness ratio, it can again be laminated to multilayer the base film so as to have a multilayer structure of four or more layers.

The apparatus or method that can be used in the step of multilayering a base film by laminating the co-extruded product is not particularly limited, and for example, the extruded product is laminated one or more times through a device such as a layer separating device (or an interfacial surface generator) as shown in FIG. 3, to form a multilayer.

The layer separating device may include a laminate inlet in which a co-extruded product is injected, a channel in which laminated materials are divided, and a stacking part in which the divided laminate is re-laminated. The structure of the laminate injected into the layer separating device is divided by the channel, and then re-laminated at the stacking part to form a multilayer.

The number of layers of the finally multilayered laminate can be adjusted depending on the number of layers and the number of channels of the co-extruded laminate introduced into the layer separating device.

For example, when the co-extruded laminate injected into the layer separating device has a three-layer structure and the number of channels of the layer separating device is two, the laminate of the three-layer structure is divided into the upper channel and the lower channel, respectively, and then a three-layer laminate of the upper channel and a three-layer laminate of the lower channel are laminated together at the stacking part to form a laminate of a six-layer structure. Continuously, when applying one additional layer separating device, a laminate of a 12-layer structure is finally formed.

However, specific contents concerning the layer separating device that can be used in the manufacturing method of the embodiment of the invention are not limited to the contents described above, and a layer separating device which is known to be usable in the process of melting and molding the polymer resin can be used without particular limitation.

Even in the step of forming a multilayer structure as described above, an entanglement phenomenon of polymer chains between the interfaces is generated. Under a predetermined condition, a phenomenon in which an inner layer and an outer layer are reversed can also be induced, thus causing a closer and more complete entanglement phenomenon of polymer chains.

The base film forming step may include a step of extruding the co-extruded product or the multilayered co-extruded product in the form of a film.

In the extruding process, an extrusion die which is known to be usable for extruding a polymer resin may be used without specific limitations, but a T-type die may be preferably used so that a thickness of a base film may become more uniform or orientation may not be generated in the base film.

The base film formed as above may be an unstretched film.

If the base film is in the form of an unstretched film, it has a low modulus and high strain and thus it can be suitably applied to a tire molding process during which high expansion occurs.

Further, in the unstretched film, since the crystallization phenomenon hardly occurs, it is possible to prevent the occurrence of damage such as cracks due to repeated deformations.

Moreover, in the unstretched film, since orientation in a particular direction and deviation of the physical properties are not large, an inner liner having uniform physical properties can be obtained.

Specifically, the base film forming step can be carried out so that the co-extruded product of the first resin and the second resin is not stretched in the machine direction (MD) or in the transverse direction (TD).

Thus, the polymer film for an inner liner may include a co-extruded unstretched base film.

It is possible to further include a step of forming a base film in the form of a film with a thickness of 0.2 μm to 3,000 μm, 2 to 2,500 μm, or 4 μm to 2,000 μm by cooling the co-extruded products of the first resin and the second resin.

The melt-extruded product obtained by the co-extruding step as described above may be formed into a film having a uniform thickness while cooling to a predetermined temperature.

Specific devices or methods which can be used in the cooling process are not greatly limited, and for example, it is possible to solidify the product of the co-extrusion process at the cooling part which is cooled at room temperature or maintained at a temperature of 5° C. to 40° C.

The base film forming step may adjust the thickness of the molten resin sheet discharged by combining a discharge amount of the extruder and a width or gap of the die, and a winding speed of the cooling roll, or it may adjust the thickness of the base film to 0.2 μm to 3,000 μm, 2 μm to 2,500 μm, or 4 μm to 2,000 μm by uniformly adhering and cooling the film by means of an air knife and an air nozzle, a vacuum device, and an electrostatic edge pinning device.

As the second resin and the first resin are co-extruded, it is possible to have a high gas barrier property expressed from the polyamide-based resin, together with an elastomeric property expressed from the copolymer including polyamide-based segments and polyether-based segments.

Specific contents concerning the polyamide-based resin and the copolymer including polyamide-based segments and polyether-based segments include all the contents described above concerning the co-extruded film of one embodiment of the invention.

The total content of polyether-based segments in the base film obtained in the manufacturing method of the invention may be 2% to 40% by weight, 3% to 35% by weight, 4% to 30% by weight, or 5% to 25% by weight.

When the content of the polyether-based segment is less than 2% by weight of the overall base film, the modulus of the base film layer or the film for an inner liner is increased and thus the moldability of the tire is lowered or the physical properties due to repeated deformation may be greatly lowered.

When the content of the polyether-based segment exceeds 40% by weight of the overall base film, the gas barrier property required for the film for an inner liner may be lowered and the reactivity to the adhesive is reduced, and thus it may be difficult for an inner liner to easily bond to a carcass layer. In addition, the elasticity of the base film is increased and thus manufacture of the uniform film may not be easy.

When the content ratio of the polyether-based segment in the base film is maintained in the range of 2% to 40% by weight, the copolymer may include polyamide-based segments and polyether-based segments in a predetermined weight ratio.

For example, the copolymer including polyamide-based segments and polyether-based segments may include the polyamide-based segment and the polyether-based segment in a weight ratio of 1:9 to 9:1, 2:8 to 8:2, or 3:7 to 7:3.

Further, when the content ratio of the polyether-based segment in the above-described base film is maintained in the range of 2% to 40% by weight, the first resin and the second resin can be co-extruded by being used in a weight ratio of 9:1 to 1:9, or 8:2 to 2:8.

Each of the first resin and the second resin may further include one or more additives selected from the group consisting of a heat-resistant agent, a crosslinking agent, and an antioxidant.

These additives can be included in an amount of 0.001% to 10% by weight in each of the first resin and the second resin.

The method for manufacturing a polymer film according to the embodiment of the invention may further include a step of forming an adhesive layer including a resorcinol-formalin-latex (RFL)-based adhesive on at least one side of the base film.

The adhesive layer including the resorcinol-formalin-latex (RFL)-based adhesive can be formed by coating the resorcinol-formalin-latex (RFL)-based adhesive on one side of the base film layer, or it can be formed by laminating an adhesive film including a resorcinol-formalin-latex (RFL)-based adhesive on one side of the base film.

Preferably, the adhesive layer forming step can be carried out by coating the resorcinol-formalin-latex (RFL)-based adhesive on one side or both sides of the formed base film.

The formed adhesive layer may have a thickness of 0.1 μm to 20 μm, and preferably 0.1 μm to 10 μm.

The resorcinol-formalin-latex (RFL)-based adhesive may include 2% to 32% by weight, preferably 10% to 20% by weight of a condensate of resorcinol and formaldehyde, and 68% to 98% by weight, preferably 80% to 90% by weight of latex.

More specific contents concerning the specific components or the like of the resorcinol-formalin-latex (RFL)-based adhesive include the contents described above concerning the co-extruded film of one embodiment of the invention.

Advantageous Effects of the Invention

According to the present invention, a co-extruded film for an inner liner which can endow an excellent gas barrier property even to tires having a thin thickness, thereby reducing the weight of tires and improving the fuel efficiency of automobiles, and ensure high elasticity together with excellent durability and fatigue resistance in a tire manufacturing process or in an automobile running process, a manufacturing method capable of providing the co-extruded film for an inner liner, and a pneumatic tire including the above-mentioned co-extruded film for an inner liner may be provided.

When using the co-extruded film for an inner liner, even without a change in the tire compound or the tread design, the running stability of automobiles or the dimensional stability of a tire can be improved while lowering the overall weight of the tire while improving the fuel efficiency.

BRIEF DESCRIPTION OF THE DRAWINGS

FIG. 1 schematically illustrate the structure of a pneumatic tire.

FIG. 2 schematically illustrates the process of manufacturing a film having a multilayer structure by using a feed block in examples.

FIG. 3 schematically illustrates a layer separating device for interfacial surface generator) used in examples.

DETAILED DESCRIPTION OF THE EMBODIMENTS

Hereinafter, the present invention will be described in more detail with reference to the following examples. However, these examples are only to illustrate the invention and the scope of the invention is not limited thereto.

Example

Manufacture of a Polymer Film for an Inner Liner

Example 1

(1) Manufacturing of a Base Film

A nylon 6 resin having a relative viscosity (96% sulfuric acid solution) of 3.6 manufactured from ε-caprolactam and a copolymer having a weight average molecular weight of 110,000 containing polyether-based segments whose main chain is an amine group-terminated polypropylene oxide and polyamide-based segments derived from ε-caprolactam (the weight ratio of polyether-based segments:polyamide-based segments is 1:3) were mixed in a weight ratio of 6:4 to produce a first resin.

Then, the nylon 6 having a relative viscosity (96% sulfuric acid solution) of 3.6 and the copolymer having a weight average molecular weight of 110,000 were mixed in a weight ratio of 4:6 to produce a second resin.

After drying the first resin and the second resin, respectively, a base film was manufactured by using two extruders and a feed block of a three-layer structure. In the first extruder, the first resin which is a raw material constituting the first resin layer (B layer) was injected and then extruded at 255° C. In the second extruder, the second resin which is a raw material constituting the second resin layer (A layer) was injected and then extruded at 260° C.

As schematically shown in FIG. 2, a feed block having a three-layer structure was provided on the top of the extrusion die to form a multilayer structure, and a flow of the molten resin of the multilayer film having a three-layer structure in which a first resin layer (B layer) forms a core layer and a second resin layer (A layer) forms a skin layer [second resin layer (A layer)/first resin layer (B layer)/second resin layer (A layer)] was produced.

The flow of the molten resin of the multilayer film formed with the above-described structure and composition was extruded through a T-type die (die gap-1.5 mm), and then the molten resin was cooled and solidified into a film with a uniform thickness using an air knife on the surface of a cooling roll that was controlled to 20° C. to obtain an unstretched base film of a three-layer structure having a thickness of 100 μm at a speed of 15 m/min.

At this time, one second resin layer (A layer) accounted for 10% of the entire base film and the first resin layer (B layer) accounted for 80% of the thickness of the entire base film.

(2) Coating of Adhesive

Resorcinol and formaldehyde were mixed in a mole ratio of 1:2 and then subjected to a condensation reaction to obtain a condensate of resorcinol and formaldehyde.

12 wt % of the condensate of resorcinol and formaldehyde and 88 wt % of styrene/butadiene-1,3/vinylpyridine latex were mixed to obtain a resorcinol-formalin-latex (RFL)-based adhesive with a concentration of 20%.

Then, the resorcinol-formalin-latex (RFL)-based adhesive was coated on the unstretched base film of a three-layer structure using a gravure coater, then dried and reacted at 150° C. for 1 min to form an adhesive layer having a thickness of 3 μm.

Example 2

(1) Manufacturing of a Base Film

A polyamide-based resin having a relative viscosity (96% sulfuric acid solution) of 3.8 synthesized by using 95 wt % of ε-caprolactam and 5 wt % of 2-azacyclononanone, and a copolymer having a weight average molecular weight of 100,000 containing polyether-based segments whose main chain is an amine group-terminated polypropylene oxide and polyamide-based segments derived from ε-caprolactam (the weight ratio of polyether-based segments:polyamide-based segments is 1:4), were mixed in a weight ratio of 7:3 to produce a first resin.

The polyamide-based resin having a relative viscosity (96% sulfuric acid solution) of 3.8 and the copolymer having a weight average molecular weight of 100,000 were mixed in a weight ratio of 4:6 to produce a second resin.

Then, the copolymer having a weight average molecular weight of 100,000 was used alone as another second resin.

The first resin and two types of the second resins were used, and three extruders, a feed block of a three-layer structure, and a continuously connected two-layer separating device (2 channel interfacial surface generator) were used to manufacture a base film.

Specifically, in the first extruder, the first resin in which the polyamide-based resin and the copolymer having a weight average molecular weight of 100,000 were mixed in a weight ratio of 7:3 was dried, and then injected and extruded at 255° C. In the second extruder, the other second resin (a copolymer having a weight average molecular weight of 100,000) was dried and then injected and extruded at 260° C. In the third extruder, the second resin in which the polyamide-based resin and the copolymer having a weight average molecular weight of 100,000 were mixed in a weight ratio of 4:6 was dried, and then injected and extruded at 260° C.

After the extrusion, in order to form a multilayer structure, in the feed block of a three-layer structure installed on the top of the two layer separating device, a core layer (B-layer) was formed from the product extruded from the first extruder, and a skin layer (A layer and C layer) was formed from the product extruded from the second extruder and the third extruder, to form a flow of the molten resin having a three-layer structure [A layer/B layer/C layer].

In the three-layer structure of "A layer/B layer/C layer" formed from the feed block, the layer structure was constituted so that the thickness of the A layer accounted for 5% of the entire thickness of a three-layer structure, the thickness of the B layer accounted for 85% of the entire thickness of a three-layer structure, and the thickness of the C layer accounted for 10% of the entire thickness of a three-layer structure.

Continuously, in order to multilayer the flow of the molten resin having a three-layer structure with a thinner thickness, the layers were separated by using a two-layer separating device (2-channel interfacial surface generator) connected in series to the feed block, and then laminated to form a multilayer.

That is, the three-layer structure of "A layer/B layer/C layer" formed in the feed block was passed through the first two-layer separating device (2-channel interfacial surface generator), and then the three-layer structure was separated and laminated to form a multilayer of a six-layer structure ("A/B/C/A/B/C"). Subsequently, the six-layer structure was passed through the second two-layer separating device (2-channel interfacial surface generator), and then the six-layer structure was separated and laminated in the same manner to form a 12-layer structure ("A/B/C/A/B/C/A/B/C/A/B/C").

The flow of the molten resin of the multilayer film formed with the above-described structure and composition was extruded through a T-type die (die gap-1.5 mm), and then the molten resin was cooled and solidified into a film with a uniform thickness using an air knife on the surface of a cooling roll that was controlled to 18° C. to obtain an unstretched base film of a multilayer structure having a thickness of 100 μm at a speed of 10 m/min.

(2) Coating of Adhesive

Resorcinol and formaldehyde were mixed in a mole ratio of 1:2 and then subjected to a condensation reaction to obtain a condensate of resorcinol and formaldehyde.

15 wt % of the condensate of resorcinol and formaldehyde and 85 wt % of styrene/butadiene-1,3/vinylpyridine latex were mixed to obtain a resorcinol-formalin-latex (RFL)-based adhesive with a concentration of 25%.

The resorcinol-formalin-latex (RFL)-based adhesive was then coated on the unstretched base film of a 12-layer structure using a gravure coater, and dried and reacted at 150° C. for 1 min to form an adhesive layer having a thickness of 5 μm.

Example 3

(1) Manufacturing of a Base Film

A nylon 6 resin having a relative viscosity (96% sulfuric acid solution) of 3.8 manufactured from ε-caprolactam, and a copolymer having a weight average molecular weight of 120,000 containing polyether-based segments whose main chain is an amine group-terminated polyethylene oxide and polyamide-based segments derived from ε-caprolactam (the weight ratio of polyether-based segments:polyamide-based segments is 1:4), were mixed in a weight ratio of 4:6 to produce a first resin.

The first resin was injected into liquid nitrogen using Freezer Mill 6750 (SPEX CertiPrep) equipment and pulverized, and then the melt viscosity was measured using Rheo-Tester 2000 (GöttFert) equipment. As a result, the product had a melt viscosity of 4,100 poise at a temperature of 255° C. and a shear rate of 500 $s^{-1}$.

Then, the nylon 6 having a relative viscosity (96% sulfuric acid solution) of 3.8 and the copolymer having a weight average molecular weight of 120,000 were mixed in a weight ratio of 6:4 to produce a second resin.

The melt viscosity was measured by using the same equipment and measuring method as the first resin. As a result, the second resin had a melt viscosity of 4,610 poise at a temperature of 255° C.

After drying the first resin and the second resin, respectively, a base film was manufactured by using two extruders and a feed block of a three-layer structure. In the first extruder, the first resin which is a raw material constituting the first resin layer (B layer) was injected and then extruded at 255° C. In the second extruder, the second resin which is a raw material constituting the second resin layer (A layer) was injected and then extruded at 255° C.

As schematically shown in FIG. 2, a feed block having a three-layer structure was provided on the top of the extrusion die to form a multilayer structure. In the feed block, a flow of the molten resin of the multilayer film having a three-layer structure in which the first resin layer (B layer) forms a core layer and the second resin layer (A layer) forms a skin layer [second resin layer (A layer)/first resin layer (B layer)/second resin layer (A layer)] was produced.

The flow of the molten resin of the multilayer film formed with the above-described structure and composition was extruded through a T-type die (die gap-1.0 mm), and then the molten resin was cooled and solidified into a film with a uniform thickness using an air knife on the surface of a cooling roll that was controlled to 17° C. to obtain an unstretched base film of a three-layer structure having a thickness of 100 μm at a speed of 10 m/min.

At this time, the flow rate of the first resin was set to 176.4 kg/h and the total flow rate of the second resin was set to 75.6 kg/h, so that one second resin layer (A layer) accounted for 15% of the entire base film and the first resin layer (B layer) accounted for 70% of the thickness of the entire base film.

(2) Coating of Adhesive

Resorcinol and formaldehyde were mixed in a mole ratio of 1:2 and then subjected to a condensation reaction to obtain a condensate of resorcinol and formaldehyde.

12 wt % of the condensate of resorcinol and formaldehyde and 88 wt % of styrene/butadiene-1,3/vinylpyridine latex were mixed to obtain a resorcinol-formalin-latex (RFL)-based adhesive with a concentration of 20%.

The resorcinol-formalin-latex (RFL)-based adhesive was then coated on two sides of the unstretched base film of a three-layer structure using a gravure coater, and dried and reacted at 150° C. for 1 min to form an adhesive layer having a thickness of 3 μm on the two sides.

Example 4

(1) Manufacturing of a Base Film

A polyamide-based copolymer resin having a relative viscosity (96% sulfuric acid solution) of 3.6 [synthesized by using ε-caprolactam and adipic acid in a weight ratio of 94:6], a copolymer having a weight average molecular weight of 80,000 [synthesized by using polyether-based segments whose main chain is polytetramethylene oxide:polyamide-based segments derived from ε-caprolactam in a weight ratio of 1:4], and a copolymer having a weight average molecular weight of 110,000 [synthesized by using polyether-based segments whose main chain is an amine group-terminated polypropylene oxide:polyamide-based segments derived from ε-caprolactam in a weight ratio of 1:3] were mixed in a weight ratio of 1:2:1 to produce a first resin.

Similarly to Example 3, the first resin was injected into liquid nitrogen using Freezer Mill 6750 (SPEX CertiPrep) equipment and pulverized, and then the melt viscosity was measured using Rheo-Tester 2000 (GöttFert) equipment. As a result, the product had a melt viscosity of 3,150 poise at a temperature of 255° C. and a shear rate of 500 $s^{-1}$.

Then, the polyamide-based copolymer resin having a relative viscosity (96% sulfuric acid solution) of 3.6, the copolymer having a weight average molecular weight of 80,000, and the copolymer having a weight average molecular weight of 110,000 were mixed in a weight ratio of 2:1:1 to produce a second resin.

The melt viscosity was measured by using the same equipment and measuring method as the first resin. As a result, the second resin had a melt viscosity of 4,230 poise at a temperature of 255° C.

After drying the first resin and the second resin, respectively, a base film was manufactured by using two extruders and a feed block of a three-layer structure. In the first extruder, the first resin which is a raw material constituting the first resin layer (B layer) was injected and then extruded at 255° C. In the second extruder, the second resin which is a raw material constituting the second resin layer (A layer) was injected and then extruded at 255° C.

As schematically shown in FIG. 2, a feed block having a three-layer structure was provided on the top of the extrusion die to form a multilayer structure. In the feed block, a flow of the molten resin of the multilayer film having a three-layer structure in which the first resin layer (B layer) forms a core layer and the second resin layer (A layer) forms a skin layer [second resin layer (A layer)/first resin layer (B layer)/second resin layer (A layer)] was produced.

The flow of the molten resin of the multilayer film formed with the above-described structure and composition was extruded through a T-type die (die gap-1.2 mm), and then the molten resin was cooled and solidified into a film with a uniform thickness using an air knife on the surface of a cooling roll that was controlled to 15° C. to obtain an unstretched base film of a three-layer structure having a thickness of 100 μm at a speed of 15 m/min.

At this time, the flow rate of the first resin was set to 113.4 kg/h and the total flow rate of the second resin was set to 264.6 kg/h, so that one second resin layer (A layer) accounted for 35% of the entire base film and the first resin layer (B layer) accounted for 30% of the thickness of the entire base film.

(2) Coating of Adhesive

Resorcinol and formaldehyde were mixed in a mole ratio of 1:2, and then subjected to a condensation reaction to obtain a condensate of resorcinol and formaldehyde.

15 wt % of the condensate of resorcinol and formaldehyde and 85 wt % of styrene/butadiene-1,3/vinylpyridine latex were mixed to obtain a resorcinol-formalin-latex (RFL)-based adhesive with a concentration of 25%.

The resorcinol-formalin-latex (RFL)-based adhesive was then coated on two sides of the unstretched base film of a three-layer structure using a gravure coater, and dried and reacted at 150° C. for 1 min to form an adhesive layer having a thickness of 2 μm on the two sides.

Example 5

(1) Manufacturing of a Base Film

A copolymer having a weight average molecular weight of 65,000 containing polyether-based segments whose main chain is a polytetramethylene oxide and polyamide-based segments derived from ε-caprolactam (the weight ratio of polyether-based segments:polyamide-based segments is 1:3) was prepared as a first resin.

Similarly to Example 3, the first resin was injected into liquid nitrogen using Freezer Mill 6750 (SPEX CertiPrep) equipment and pulverized, and then the melt viscosity was measured using Rheo-Tester 2000 (GöttFert) equipment. As a result, the product had a melt viscosity of 2,658 poise at a temperature of 255° C. and a shear rate of 500 $s^{-1}$.

The polyamide-based resin [relative viscosity (96% sulfuric acid solution) of 3.8] synthesized by using 95 wt % of δ-caprolactam and 5 wt % of δ-valerolactam, and a copolymer resin having a weight average molecular weight of 65,000, were mixed in a weight ratio of 3:7 to produce a second resin.

The melt viscosity was measured by using the same equipment and measuring method as the first resin. As a result, the second resin had a melt viscosity of 3,494 poise at a temperature of 255° C.

The polyamide-based resin [relative viscosity (96% sulfuric acid solution) of 3.8] and the copolymer having a weight average molecular weight of 65,000 were then mixed in a weight ratio of 6:4 to produce another second resin.

The melt viscosity was measured by using the same equipment and measuring method as the first resin. As a result, the other second resin had a melt viscosity of 4,331 poise at a temperature of 255° C.

A base film was manufactured by using the first resin, the second resin, and another second resin, by means of two continuously connected two-layer separating devices (2 channel interfacial surface generators).

Specifically, in the first extruder, the first resin in which the polyamide-based resin and the copolymer having a weight average molecular weight of 65,000 were mixed in a weight ratio of 3:7 was dried, and then injected and extruded at 255° C. In the second extruder, the first resin in which the copolymer having a weight average molecular weight of 65,000 was used alone was dried, then injected and extruded at 255° C. In the third extruder, the other second resin in which the polyamide-based resin and the copolymer having a weight average molecular weight of 65,000 were mixed in a weight ratio of 6:4 was dried, and then injected and extruded at 255° C.

After the extrusion, in order to form a multilayer structure, in the feed block of a three-layer structure installed on the top of the two-layer separating device, a core layer (B-layer) was formed from the product extruded from the second extruder, and a skin layer (A layer and C layer) was formed from the product extruded from the first extruder and the third extruder, to form a flow of the molten resin having a three-layer structure [A layer/B layer/C layer].

In the three-layer structure of "A layer/B layer/C layer" formed from the feed block, the flow rate of the first resin was set to 201.6 kg/h, the flow rate of the second resin was set to 151.2 kg/h and the flow rate of the other second resin was set to 151.2 kg/h, so that the thickness of the A layer accounted for 30% of the entire thickness of a three-layer structure, the thickness of the B layer accounted for 40% of the entire thickness of a three-layer structure, and the thickness of the C layer accounted for 30% of the entire thickness of the three-layer structure.

Continuously, in order to multilayer the flow of the molten resin having a three-layer structure with a thinner thickness, the layers were separated by using a two-layer separating device (2-channel interfacial surface generator) connected in series to the feed block, and then laminated to form a multilayer.

That is, the three-layer structure of "A layer/B layer/C layer" formed in the feed block was passed through the first two-layer separating device (2-channel interfacial surface generator), and then the three-layer structure was separated and laminated to form a multilayer of a six-layer structure ("A/B/C/A/B/C"). Continuously, the six-layer structure was passed through the second two-layer separating device (2-channel interfacial surface generator), and then the six-layer structure was separated and laminated in the same manner to form a 12-layer structure ("A/B/C/A/B/C/A/B/C/A/B/C").

The flow of the molten resin of the multilayer film formed with the above-described structure and composition was extruded through a T-type die (die gap-1.5 mm), and then the molten resin was cooled and solidified into a film with a uniform thickness using an air knife on the surface of a cooling roll that was controlled to 20° C. to obtain an unstretched base film of a multilayer structure having a thickness of 100 μm at a speed of 20 m/min.

(2) Coating of Adhesive

Resorcinol and formaldehyde were mixed in a mole ratio of 1:2 and then subjected to a condensation reaction to obtain a condensate of resorcinol and formaldehyde.

15 wt % of the condensate of resorcinol and formaldehyde and 85 wt % of styrene/butadiene-1,3/vinylpyridine latex were mixed to obtain a resorcinol-formalin-latex (RFL)-based adhesive with a concentration of 25%.

Then, the resorcinol-formalin-latex (RFL)-based adhesive was coated on two sides of the unstretched base film of a three-layer structure using a gravure coater, and dried and reacted at 150° C. for 1 min to form an adhesive layer having a thickness of 5 μm on the two sides.

Experimental Example

Experimental Example 1

Measurement of Heat-Resistant Toughness and Heat-Resistant Toughness Retention (1) Measurement of Heat-Resistant Toughness The heat-resistant toughness of the base film obtained in Examples 1 and 2 was measured as follows.

The base film sample was left for 24 h at 23° C. and 50 RH % conditions and then left in a hot air oven at 170° C. for 1 h. Immediately thereafter, the sample was continuously left in a hot air oven at 100° C. for 1 h, and the sample was set to a length of 30 mm, a width of 30 mm, and a tensile speed of 300 mm/min under a 23° C. and 50 RH % atmosphere. The strength at break and the elongation at break in a machine direction (MD) and transverse direction (TD) of the heat-treated base film were measured ten times using a universal tensile testing machine (Instron) to obtain the average of eight values excluding the maximum value and the minimum value.

In order to minimize deviation caused by the external environment during the heat treatment, the sample for the tensile test was cut to a size required for the measurement before the heat treatment, and subjected to heat treatment to minimize the change in the physical properties. The measurement was completed within 15 min of heat treatment.

Using the values of the strength at break and the elongation at break of the base film after the heat treatment, the toughness in a machine direction (MD) and transverse direction (TD) of the base film was measured in accordance with the following Equation 1.

Heat-resistant toughness of base film (MPa)=strength at break (MPa)×SQRT [elongation at break (%)]  <Equation 1>

(wherein SQART means a square root)

(2) Measurement of Heat-Resistant Toughness Retention

The heat-resistant toughness retention of the base film obtained in Examples 3 to 5 was measured as follows.

The base film sample was left for 24 h at 23° C. and 50 RH % conditions and then left in a hot air oven at 170° C. for 1 h. Immediately thereafter, the sample was continuously left in a hot air oven at 100° C. for 1 h, and the sample was set to a length of 30 mm, a width of 30 mm, and a tensile speed of 300 mm/min at 23° C. under a 50 RH % atmosphere. The strength at break and the elongation at break in a machine direction (MD) and a transverse direction (TD) of the heat-treated base film were respectively measured ten times using a universal tensile testing machine (Instron) to obtain the average of eight values excluding the maximum value and the minimum value.

In addition, the base film sample was left for 24 h at 23° C. and 50 RH % conditions, and then the strength at break and the elongation at break in a machine direction (MD) and transverse direction (TD) of the heat-treated base film were calculated in the same manner as described above without the heat treatment.

In order to minimize the deviation caused by the external environment during the heat treatment, the sample for the tensile test was cut to a size required for the measurement before the heat treatment, and subjected to heat treatment to minimize the change in the physical properties. The measurement was completed within 15 min of the heat treatment.

Using the values of the strength at break and the elongation at break of the base film after the heat treatment, the heat-resistant toughness retention in a machine direction (MD) and a transverse direction (TD) of the base film was measured in accordance with the following Equation 2.

Heat-resistant toughness retention (%)=Toughness of base film after heat treatment (MPa)/Toughness of base film before heat treatment (MPa)×100  <Equation 2>

Experimental Example 2

Oxygen Permeability Test

The oxygen permeability of the polymer film for a tire inner liner obtained in the examples was measured at 25° C. under a 60 RH % atmosphere using a Gas Transmission Rate Tester (Model BR-1/BT-2, Toyoseiki Seisaku-Sho) in accordance with the test method of ASTM D 1434.

Experimental Example 3

Measurement of Molding Easiness

Tires were manufactured with a size of 205R/65R16 in groups of 100 using the polymer film for a tire inner liner of the examples. During the tire manufacturing process, the manufacturing easiness and appearance were evaluated after manufacturing a green tire, and then the final appearance of the tire was observed after vulcanization.

In this case, when there was no distortion in a green tire or a tire after vulcanization and a standard deviation of diameter was within 5%, it was evaluated as "good". Also, when distortion was generated in a green tire or a tire after vulcanization and thus the tire was not properly manufactured or the inner liner inside the tire was melted or torn and broken or when a standard deviation of the diameter was greater than 5%, it was evaluated as "bad". In the 100 tires manufactured by applying the polymer film for an inner liner according the embodiment of the invention, the number of tires having a good appearance was evaluated to determine the molding easiness. The molding easiness was calculated in accordance with the following Equation 3.

Molding easiness (%)=Number of tires evaluated as "good"/100 (number of manufactured tires)×100 (%)  <Equation 3>

Experimental Example 4

Measurement of Durability

The durability of the tires manufactured in Experimental Example 3 was evaluated while increasing a load using a measurement method of FMVSS139 tire durability.

The durability measurement was conducted by two methods of an endurance test of increasing a load by steps, and a high speed test of increasing a speed, to verify the presence or absence of cracks inside of the tire. When there were no cracks, it was indicated as "good", and when cracks occurred, it was indicated as "bad".

The final appearance of the tire was evaluated by the method of Experimental Example 3. The tires having a good appearance were selected in groups of 20, and the endurance test and the high speed test were conducted for groups of 10, respectively, to confirm the presence or absence of cracks. After measuring the durability for the 10 tires, the durability of the tires was determined based on the number of good tires without the occurrence of cracks, according to the endurance test and the high speed test as shown in the following Equation 4.

Durability of tires (%)=Number of "good" tires/10 (number of evaluated tires)×100(%)  <Equation 4>

Experimental Example 5

Measurement of Internal Pressure Retention

The internal pressure retention for 90 d as shown in the following Equation 5 was measured for the tire manufactured in Experimental Example 3 at a temperature of 21° C. under a pressure of 101.3 kPa in accordance with the test method ASTM F1112-06.

Internal Pressure Retention (%)={1−(Tire inflation pressure upon initial testing−Tire inflation pressure after having left for 90 $d$)/(Tire inflation pressure upon initial testing)}×100  <Equation 5>

The results of the Experimental Examples 1 to 5 are shown in Table 1 below.

TABLE 1

|  |  | Example 1 | Example 2 |
|---|---|---|---|
| Oxygen permeability [cc/(m$^2$ · 24 h · atm)] | | 58 | 45 |
| Base film heat-resistant toughness (MPa) | Machine direction (MD) | 1,652 | 1,587 |
| | Transverse direction (TD) | 1,399 | 1,250 |
| Molding easiness (%) | | 100 | 99 |
| Durability of tire (%) | Endurance test | 100 | 100 |
| | High speed test | 100 | 100 |
| Internal pressure retention (%) | | 97.1 | 97.8 |

As shown in Table 1, it was confirmed that the polymer film for an inner liner obtained in Examples 1 and 2 could exhibit oxygen permeability of 60 cc/(m$^2$·24 h·atm) or less even at a thickness of about 103 μm to 105 μm and thus achieve an excellent gas barrier property even with tires having a thin thickness, secure high durability together with excellent moldability when applied to tires, and have heat-resistant toughness of 1250 MPa or more in both the machine direction and the transverse direction.

TABLE 2

|  |  | Example 3 | Example 4 | Example 5 |
|---|---|---|---|---|
| Oxygen permeability [cc/(m$^2$ · 24 h · atm)] | | 62 | 68 | 73 |
| Base film heat-resistant toughness retention (%) | Machine direction (MD) | 91 | 89 | 83 |
| | Transverse direction (TD) | 86 | 83 | 75 |
| Molding easiness (%) | | 100 | 99 | 100 |
| Durability of tire (%) | Endurance test | 100 | 100 | 100 |
| | High speed test | 100 | 100 | 100 |
| Internal pressure retention (%) | | 98.3 | 95.4 | 93.7 |

As shown in Table 2, it was confirmed that the polymer film for an inner liner obtained in Examples 3 to 5 could exhibit oxygen permeability of 80 cc/(m$^2$·24 hr·atm) or less even at a thickness of about 104 μm to 110 μm and thus achieve an excellent gas barrier property even with tires having a thin thickness, secure high durability together with excellent moldability when applied to tires, and have heat-resistant toughness retention of 70% or more in both the machine direction and the transverse direction.

The invention claimed is:

1. A co-extruded film for an inner liner: comprising a base film including a first resin layer containing a polyamide-based resin and a second resin layer containing a copolymer including polyamide-based segments and polyether-based segments
   wherein the first resin layer further includes a copolymer including polyamide-based segments and polyether-based segments,
   the second resin layer further includes a polyamide-based resin, and
   the first resin layer includes more polyamide-based resin than the second resin layer, and
   a difference between the content (wt %) of the polyamide-based resin in the first resin layer and the content (wt %) of the polyamide-based resin in the second resin layer is 5% to 85% by weight.

2. The co-extruded film according to claim 1, wherein the base film has a multilayer structure of two or more layers including one or more first resin layers and one or more second resin layers.

3. The co-extruded film according to claim 1, wherein the first resin layer includes 5% to 100% by weight of the polyamide-based resin, and
   the second resin layer includes 0% to 95% by weight of the polyamide-based resin layer.

4. The co-extruded film according to claim 1, wherein the total content of the polyether-based segments in the base film is 2% to 40% by weight.

5. The co-extruded film according to claim 1, wherein the base film has a multilayer structure of two or more layers including the first resin layer and one or more types of the second resin layer including less polyamide-based resin than the first resin layer.

6. A co-extruded film for an inner liner comprising a base film containing a first resin layer and a second resin layer,
   wherein the first resin layer includes 0% to 90% by weight of the polyamide-based resin and 10% to 100% by weight of the copolymer including polyamide-based segments and polyether-based segments and
   the second resin layer includes 5% to 95% by weight of the polyamide-based resin and 5% to 95% by weight of the copolymer including polyamide-based segments and polyether-based segments, and
   the first resin layer has a lower melt viscosity at a temperature of 240° C. to 270° C. compared to the second resin layer, and a difference in the melt viscosity between the first resin layer and the second resin layer is between 100 poise to 3,000 poise at a temperature of 240° C. to 270° C. and a shear rate of 500 s$^{-1}$.

7. The co-extruded film according to claim 6, wherein the base film includes one or more first resin layers and one or more second resin layers.

8. The co-extruded film according to claim 6, wherein the first resin layer has a melt viscosity of 600 poise to 6,000 poise at a temperature of 240° C. to 270° C. and a shear rate of 500 s$^{-1}$, and
   the second resin layer has a melt viscosity of 700 poise to 9,000 poise at a temperature of 240° C. to 270° C. and a shear rate of 500 s$^{-1}$.

9. The co-extruded film according to claim 6, wherein the total content of the polyether-based segments in the base film is 2% to 40% by weight.

* * * * *